United States Patent
Alden

(12) 
(10) Patent No.: US 6,552,860 B1
(45) Date of Patent: Apr. 22, 2003

(54) VARIABLE FRESNEL TYPE STRUCTURES AND PROCESS

(76) Inventor: Ray M. Alden, 808 Lake Brandon Trail, Raleigh, NC (US) 27610

(*) Notice: Subject to any disclaimer, the term of this patent is extended or adjusted under 35 U.S.C. 154(b) by 113 days.

(21) Appl. No.: 09/707,382

(22) Filed: Nov. 7, 2000

Related U.S. Application Data

(63) Continuation of application No. 09/596,744, filed on Jun. 19, 2000, and a continuation of application No. 09/575,601, filed on May 22, 2000, and a continuation of application No. 09/358,175, filed on Jul. 20, 1999.
(60) Provisional application No. 60/201,031, filed on May 1, 1998, provisional application No. 60/162,988, filed on Nov. 1, 1999, and provisional application No. 60/149,059, filed on Aug. 16, 1999.

(51) Int. Cl.⁷ .............. G02B 3/08; G02B 3/14
(52) U.S. Cl. ..................... 359/742; 359/666
(58) Field of Search .............. 359/665–667, 359/742, 743

(56) References Cited

U.S. PATENT DOCUMENTS 5,774,274 A * 6/1998 Schachar .................. 359/666

* cited by examiner

Primary Examiner—Scott J. Sugarman

(57) ABSTRACT

In the lens embodiment, the invention described herein incorporates a first fluid with a first refractive index in a first series of concentric surfaces and a second fluid with a second refractive index in a second series of concentric surfaces. The two surfaces being adjacent to one another alternating between a concentric circle of the first then a concentric circle of the second then the first and etc. Wherein each circular surface in the series of first and second fluid surfaces are separated by a transparent barrier with elasticity. Additionally, fluid can be added or subtracted to each concentric circle as desired through ports in their otherwise sealed chambers. The structure and process described produces a refractive and/or diffractive optical component which is predictably and reliably variable as to its focal length and transmittance direction. In the mirror embodiment, a the membrane is coated with a reflective material and is operated to form variable angles and curves and correspondingly variable focal lengths.

16 Claims, 35 Drawing Sheets piezoelectric block/tube piezoelectric stack hydraulic, piezoelectric valve magnetostrictive electromagnetic electrostatic

VARIABLE FRESNEL TYPE STRUCTURES AND PROCESS

CROSS-REFERENCE TO RELATED APPLICATIONS

This application is a continuation and is entitled to the benefit of patent application Ser. No. 09/358,175 filed Jul. 20, 1999, and of the patent application Ser. No. 09/575,601 filed May 22, 2000, and is a continuation of patent application Ser. No. 09/596,744 filed Jun. 19, 2000, and of Provisional Patent Application Ser. 60/149,059 filed Aug. 16, 1999, and of Provisional Patent Application Ser. 60/162,988 filed Nov. 1, 1999, and of Provisional Patent Application No. 60/201,031 filed May 1, 2000.

BACKGROUND FIELD OF INVENTION

This invention relates to optical surfaces commonly referred to as Fresnel surfaces. Fresnel surfaces are commonly used to direct and/or focus light in desirable ways and have remained largely unchanged since their invention nearly 200 years ago. Such surfaces commonly consist of a multitude of equidistant grated protrusions formed on a flat rigid material. They are commonly structured in concentric circles in a first embodiment or in parallel rows in a second embodiment such that both embodiments direct light in desirable ways. Fresnel gratings can perform transmissive diffraction, reflective diffraction, refraction, and/or reflection. The general advantages of Fresnel optics include the performance simulation of optical lenses, prisms, and mirrors with significant reductions in material, thickness and consequently dramatically lighter weight and less bulky optics.

BACKGROUND DESCRIPTION OF PRIOR ART

Heretofore, the designs of flattened Fresnel type lens, prism, and mirror structures have always been rigid and have not been variable regarding angular pitch and surface curvature. Commonly these devices were cut or molded into transparent plastic or glass in the case of transmissive members or coated with reflective materials in the case of reflective members. The angles and curves once cut thereon not being variable. Adding angular and curvature adjustability to Fresnel structures as described herein is a significant advancement now possible due to the present novel structures which utilize the many advances in the transparency and elasticity of polymer technology. Transparent or reflective, highly elastic extrusions welded and assembled to form a Fresnel optical membrane as described herein are angularly tunable by actuating a first rigid member relative to a second rigid member. Curves formed by the Fresnel optical membrane are tunable by varying fluid pressure in communication with the optical membrane. Tunable angles and curves formed by the optical membrane as described herein causes light to be refracted, reflected and/or diffracted predictably and reliably. In the transmissive embodiments, curves formed by the Fresnel optical membrane surfaces and a fluid with an index of refraction in communication therewith, cause light to be redirected as desired through the processes of refraction and/or diffraction. In the reflective embodiments, identical Fresnel membrane structures in conjunction with reflective properties or in communication with a reflective material and operated identically forms reflective surfaces whereby electromagnetic energy is redirected by the process of reflection and/or reflective diffraction.

Prior art teaches the use of flexible membranes such as is depicted in FIG. 1 from U.S. Pat. No. 5,684,637 (Floyd, 1997). The membranes are actuated to form a convex lens of desired focal length by varying a fluid with a refractive index contained there between. This structure and those abundantly found in prior art that are similarly actuated when used in small applications can reliably provide a range of focal lengths and coherent focal points. In many applications however, especially where the volume, physical size and weight of fluid are a consideration, an alternate approach utilizing Fresnel structures to provide coherent variable focal lengths is needed. The present invention achieves these objects with significantly reduced thickness, weight and volume.

Prior art teaches the use of a flexible mirror membrane actuated by fluid pressure such as is depicted in FIG. 2 from U.S. Pat. No. 4,890,903 (Treisman et al, 1990). Such a fluid mirror membrane can be used in some small applications where thickness is not a factor. In larger applications or where absolute mirror thickness is a consideration, the variable membrane mirror composed of Fresnel surfaces as disclosed herein is a useful unanticipated advancement over the prior art.

Prior art teaches the use of actuating rigid structures to reliably alter the path of electromagnetic energy. FIG. 3 from U.S. Pat. No. 5,166,831 (Hart, 1992) discloses the actuation of rigid planar members to vary a liquid prism angle. This and similar prior art is useful for some small applications. In large applications, the volume, physical size and weight of fluid required in these structures makes them prohibitive engineering problems. To eliminate the engineering problems of prior art, an alternate approach utilizing variable Fresnel structures to variably alter the course of electromagnetic radiation is required. Additionally, the Hart structure can not achieve a variable focal length (nor did Hart intend it to). Whereas the present invention can reliably achieve a coherent variable focal length.

Prior art discloses the use of variable lenslets. FIG. 4 from U.S. Pat. No. 5,774,273 (Bornhorst, 1998) depicts a hexagonal grid and a transmissive membrane. This system uses fluid pressure to push the membrane through the grid and thereby produces an array of variable lenslets. This lenslet array can not achieve a truly coherent focal point. Nor can this structure reliably deliver a single variable focal point. Additionally, due to the grid structure, much of the electromagnetic radiation is lost into the grid. The hexagonal structure is used to minimize the light loss due to absorption by the grid structure (if the grid had round holes, the grid would absorb even more energy). But the hexagonal structure introduces the problem of lenslet distortion because the curvature of the membrane will be distorted into a rippled curve (caused by non uniform stretching when conforming to the hexagonal shape) when being stretched through anything other than a round structure. The round hole and smooth curve are required for imaging optics when used in conjunction with and elastic membrane. The Bornhorst grid structure forces a compromise between the loss of optical integrity when using a hexagonal grid and loss of optical efficiency when using a round grid. The present invention can achieve the objects of a variable coherent focal point and length with nearly one hundred percent efficiency and with nearly no distortion. For all of these reasons, the new art embodied in the variable Fresnel structure disclosed in the present application is a significant unanticipated advancement over prior art.

Prior art FIG. 5 from U.S. Pat. No. 5,774,273 (Bornhorst, 1998) incorporates several independently variable arrays of fluid pressure variable lenslets into one collective structure. Again, the structure disclosed can not deliver a truly coherent focal point. Nor can it produce a variable focal length. This structure and the actuation methodology is not adequate for the purposes of a coherent variable lens with variable focal point and focal length. Each of these independent lenslet arrays can be directed into a similar direction but their grid shapes and positioning prohibit usage in any imaging optics applications. The new art disclosed in the present application avoids the problems associated with the lenslet formed by fluid pressure forcing a membrane through a grid structure. Further all of the new structures of the present invention can be used together to produce a coherent optic with variable focal length and a true focal point. These are all significant advancements unanticipated, unaddressed, and unachievable by prior art.

The variable prismatic surface of prior art FIG. 6 from U.S. Pat. No. 5,774,273 (Bornhorst, 1998) can incoherently simulate a focal point. This may be adequate for some imprecise lighting applications but is not adequate for any coherent applications. Specifically since the riser of the structure is not parallel to the light source, (but instead forms a second surface in the path of the light) a high percentage of light is either absorbed, reflected, or refracted by the secondary angle formed by the riser. This causes light rays to travel in undesired directions and further increases waste within the system. Waste of energy may be tolerable where excess energy can be pumped into the system such as in some lighting applications where efficiency is not a factor. But such waste is not tolerable in a coherent optical system especially where input energy is finite. Moreover the art taught in Bornhorst teaches that lenslet surfaces may be either variable with respect to curvature or be variable with respect to angle. None of the prior art membranes are variable with respect to both angular pitch and curvature. The new art disclosed in the present application efficiently and coherently redirects electromagnetic energy. Surfaces of the present application are true variable Fresnel structures that can be reliably varied with respect to angular pitch and curvature simultaneously and efficiently.

FIG. 33 prior art depicting diffraction gratings illustrates rigid diffraction gratings long known in the art. FIG. 33 is taken from Pedrotti, S. J., *Introduction to Optics,* Prentice-Hall Inc., N.J., 1993, Page 357. It depicts rigid Fresnel gratings. Specifically (b) is a blazed transmissive grating and (d) is a blazed reflective grating. Rigid gratings such as these are widely used in optical applications today. The prior art reference includes a discussion about how the angular pitches that are blazed onto the grating surfaces effect the efficiency of the structure in performing diffraction in different applications. No mention is made in prior art to any Fresnel structures incorporating variability regarding angular pitch and curvature in a single structure. The present invention achieves variable Fresnel transmissive and reflective surfaces which can be predictably and reliably changed with regard to angular pitch and curvature.

FIG. 34 prior art depicts adaptive optics methodologies. FIG. 34 is taken from Alloin, D. M., *Adaptive Optics for Astonomy,* Kluwer Academic Publishers, Netherlands, 1993, Page 152. It describes the variable reflective structures previously known in the art. While the diagrams depict wide dynamic ranges of motion, in practice the dynamic ranges are very minute. They are sued to control for distortions in astronomical observations. While the prior art does include actuating membranes with precision, it does not include any references to actuating Fresnel structures reliably with regard to angular pitch and curvature. The present Fresnel membrane invention can reliably and predictably be altered simultaneously with regard to angular pitch and curvature.

IT also provides a dramatically great dynamic range of variability compared to prior art. The present invention also provides a truly coherent focal point. The combination of all of these advantages represents a significant advancement over prior art. The present invention also achieves membrane actuation with dramatically fewer actuators than utilized in prior art, this is much more conducive to light weight optics. which is one of the historic cornerstones of Fresnel structures.

FIG. 35 prior art depicting actuation means for adaptive optics. FIG. 35 is taken from Alloin, D. M., *Adaptive Optics for Astonomy,* Kluwer Academic Publishers, Netherlands, 1993, Page 155. Many actuation means are known to the prior art. Such means can all be utilized with the present invention. In some embodiments, the present invention actually uses two actuation means simultaneously. The first means being actuation of a rigid structure which causes the Fresnel membrane to be actuated with regard to angular pitch. The second means being fluid pressure in communication with the Fresnel membrane which causes the membrane to be actuated with regard to curvature. No prior art references utilize the dual actuation strategy to achieve simultaneous angular and curvature variability.

After a review of prior art it becomes clear that variable Fresnel structures as disclosed herein are an unanticipated significant advancement over the prior art. Neither the present novel concentric circular embodiment disclosed herein nor the present novel parallel grated surface embodiment disclosed herein have been achieved or anticipated in prior art. The former is capable of achieving a coherent focal point and the later performs transmissive and reflective diffraction with much greater efficiency than the prior art. Thus, the new art disclosed herein solves problems in novel unanticipated and unaddressed ways compared to the prior art. Disclosed herein is the use of concentric elastic stretchable and collapsible surfaces which enable one optical device to incorporate alterable Fresnel surfaces or surface angles and surface curves. Also disclosed herein are is the use of variable parallel Fresnel surfaces or surface angle and surface curves. Such Fresnel surfaces in each configuration are made to be permanently variable such that one optical device has alterable focal lengths or can otherwise continually be reconfigured in real time to redirect electromagnetic radiation as desired.

Our society increasing relies on accurately and reliably directing electromagnetic radiation for communications, science, photography, illumination, entertainment, telescopy, medicine, and magnification, etc. Flexible Fresnel concentric circular structures and parallel structures as described herein add important advantages for these and other important objects. Moreover, abundant and valuable benefits provided by such structures have been heretofore unrecognized and not addressed in prior art.

SUMMARY

In the first transmissive embodiment, the invention described herein incorporates a first fluid with a first refractive index in a first series of concentric surfaces and a second fluid with a second refractive index in a coplanar second series of concentric surfaces. The two surfaces being adjacent to one another alternating between a concentric circle of the first then a concentric circle of the second then the first and etc. Wherein each circular surface in the series of first and second fluid surfaces are separated by a transparent barrier with elasticity. Additionally, fluid can be added or subtracted to each concentric circle as desired through ports in their otherwise sealed chambers. The structure and process described produces a refractive and/or diffractive optical component which is variable as to its focal length and transmittance direction.

In the second transmissive embodiment, the invention described herein incorporates a first fluid with a first refractive index in a first series of parallel surfaces and a second fluid with a second refractive index in a coplanar second series of parallel surfaces. The two surfaces being adjacent to one another alternating between a surface of the first then a surface of the second then the first and etc. Wherein each surface in the series of first and second fluid surfaces are separated by a transparent barrier with elasticity. Additionally, fluid can be added or subtracted to each surface as desired through ports in their otherwise sealed chambers. The structure and process described produces a refractive and/or diffractive optical component which is variable as to its angular pitch and curvature.

In the first reflective embodiment, the invention described herein incorporates a series of concentric reflective surfaces. Wherein each concentric surface is described by an elastic member which is variable as to angular pitch and curvature. The structure and process described produces a reflective and/or diffractive optical component which is variable as to its focal length and reflective direction.

In the second reflective embodiment, the invention described herein incorporates a series of parallel reflective surfaces. Wherein each parallel surface is described by an elastic member which is variable as to angular pitch and curvature. The structure and process described produces a refractive and/or diffractive optical component which is variable as to its focal length and reflective direction.

OBJECTS AND ADVANTAGES

Accordingly, several objects and advantages of my invention are apparent. Optical elements manufactured to incorporate the structures described have alterable focal lengths. Once deployed in the field they can be tuned to direct electromagnetic energy as desired. They then can be retuned nearly instantly to many different specifications repeatedly and predictably. The applications for lenses and mirrors with a variable focus length are far too numerous to individually enumerate herein. Clearly objects such as illumination, entertainment, communications, science, photography, telescopy, medicine, materials science and magnification (among many others) will all benefit from this new technology.

Further objects and advantages will become apparent from a consideration of the drawings and ensuing description.

DRAWING FIGURES

FIG. 1 prior art U.S. Pat. No. 5,684,637 (Floyd, 1997).

FIG. 2 prior art U.S. Pat. No. 4,890,903 (Treisman et al, 1990).

FIG. 3 prior art U.S. Pat. No. 5,166,831 (Hart, 1992).

FIG. 4 prior art U.S. Pat. No. 5,774,273 (Bornhorst, 1998).

FIG. 5 prior art U.S. Pat. No. 5,774,273 (Bornhorst, 1998).

FIG. 6 prior art U.S. Pat. No. 5,774,273 (Bornhorst, 1998).

FIG. 7 concentric optical membrane.

FIG. 8 three membranes welded.

FIG. 9 cross section of three membranes welded.

FIG. 10 chamber ports through membrane.

FIG. 11 assembled, two valve unit.

FIG. 12 light refraction through multiple surfaced cross section.

FIG. 13 multi-valve unit semi assembled.

FIG. 14 holes through membrane for multi-valve unit.

FIG. 15 multi-valve unit fully assembled.

FIG. 16 ray trace through multi-valve unit.

FIG. 17 actuation means.

FIG. 18 additional hardware.

FIG. 19 non-parallel surfaces.

FIG. 20 Fresnel variable mirror.

FIG. 21 Alternate concentric transmissive rigid members.

Figure 29:
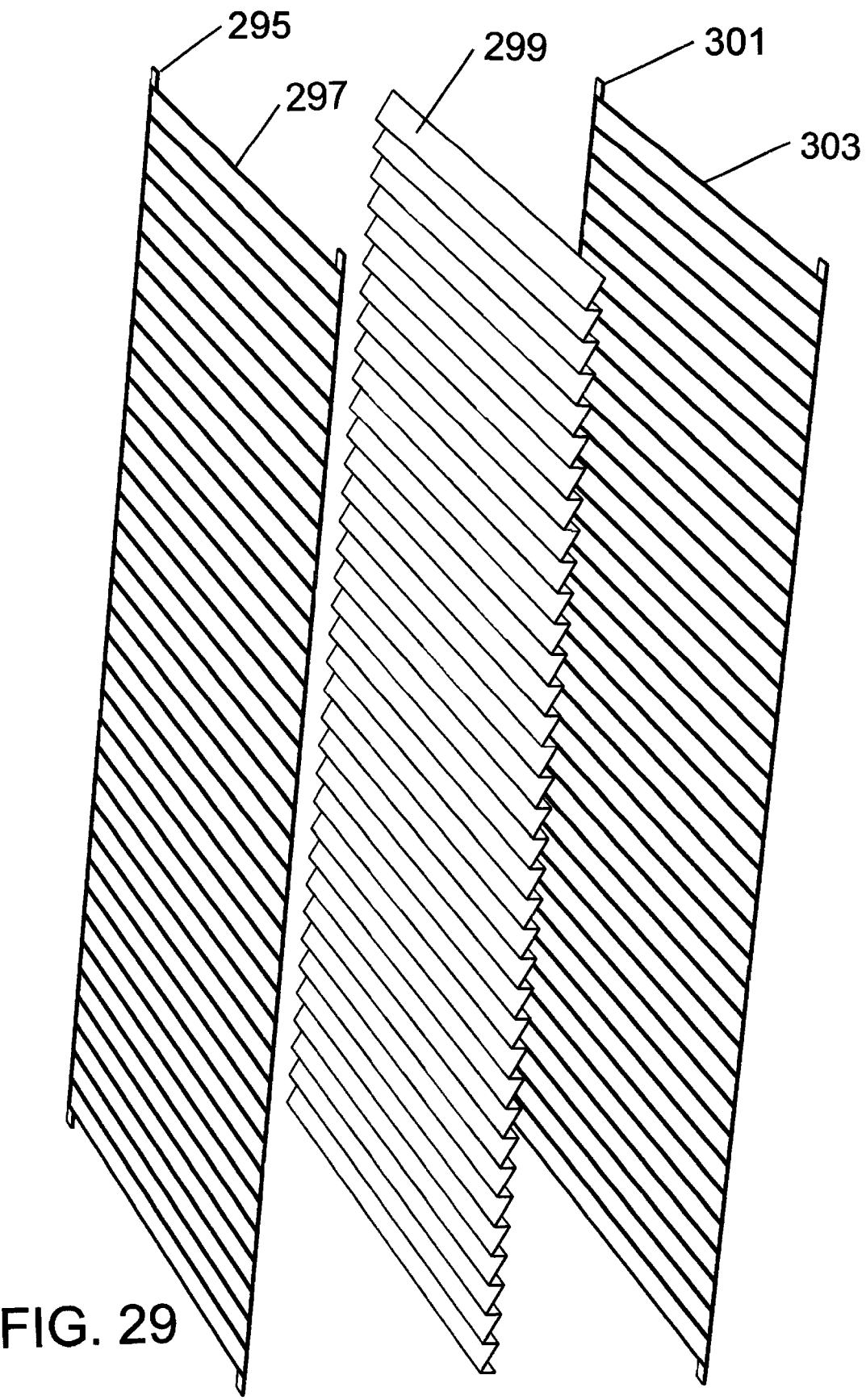

FIG. 29 Alternate parallel transmissive rigid members.

Figure 30:
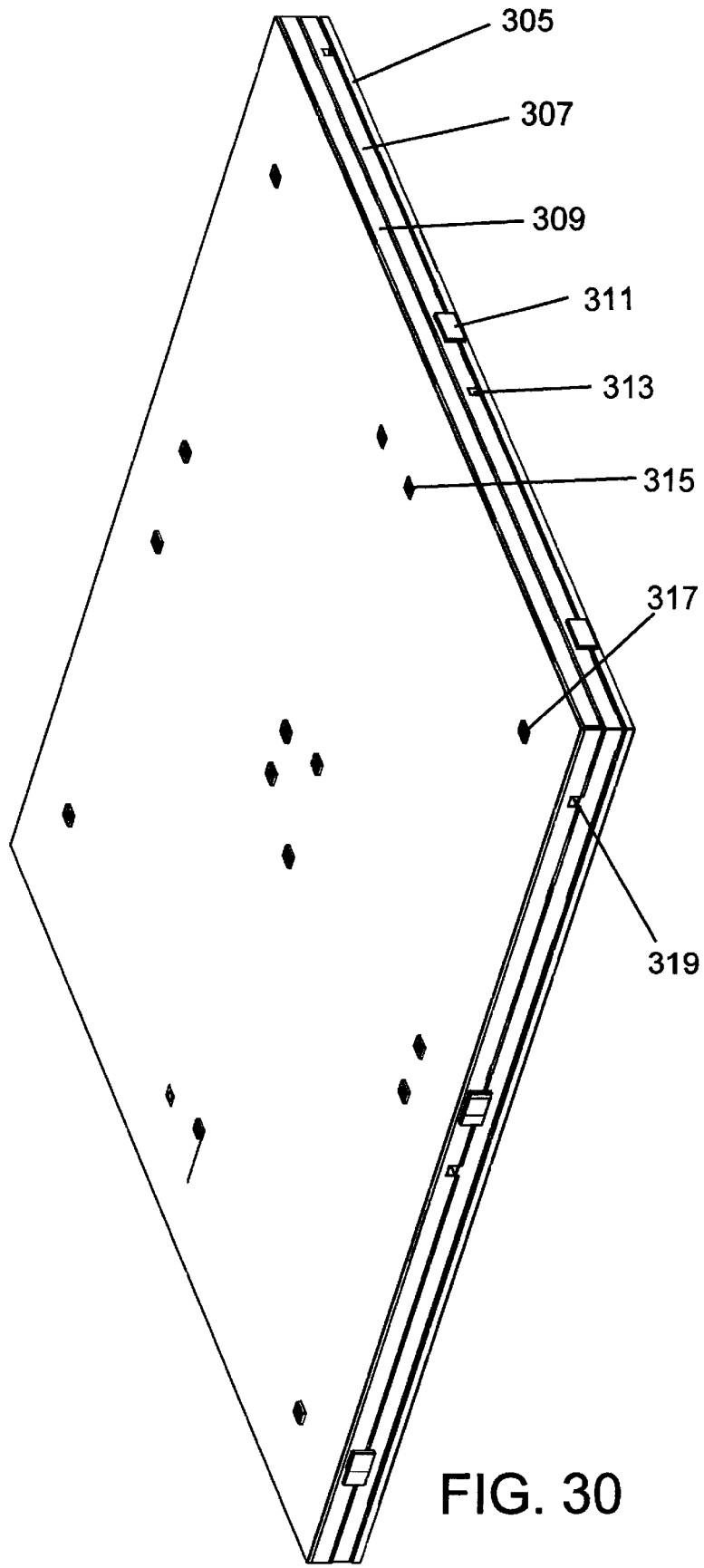

FIG. 30 illustrates a second actuation methodology.

Figure 31:
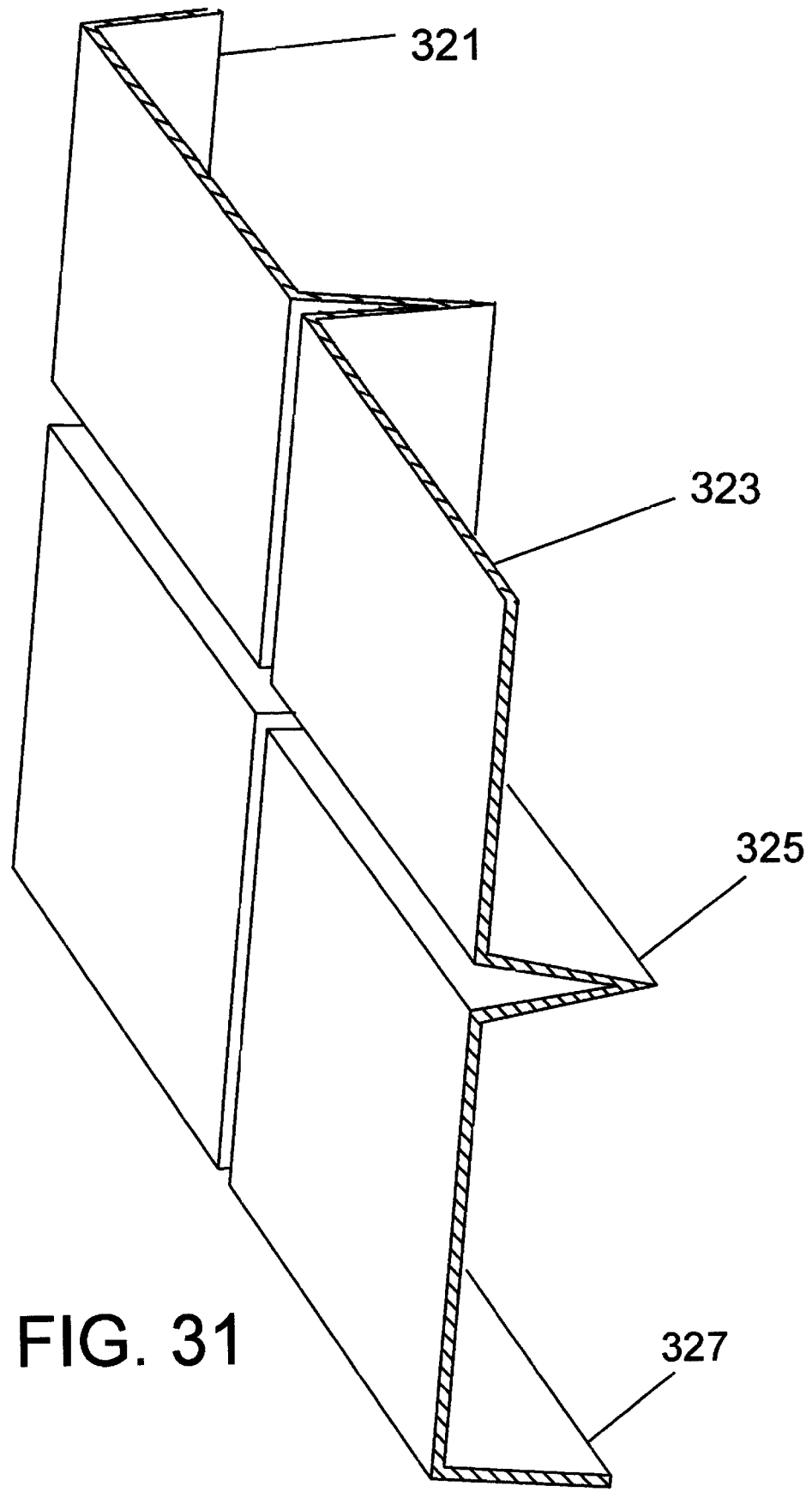

FIG. 31 alternate elastic membrane.

Figure 32:
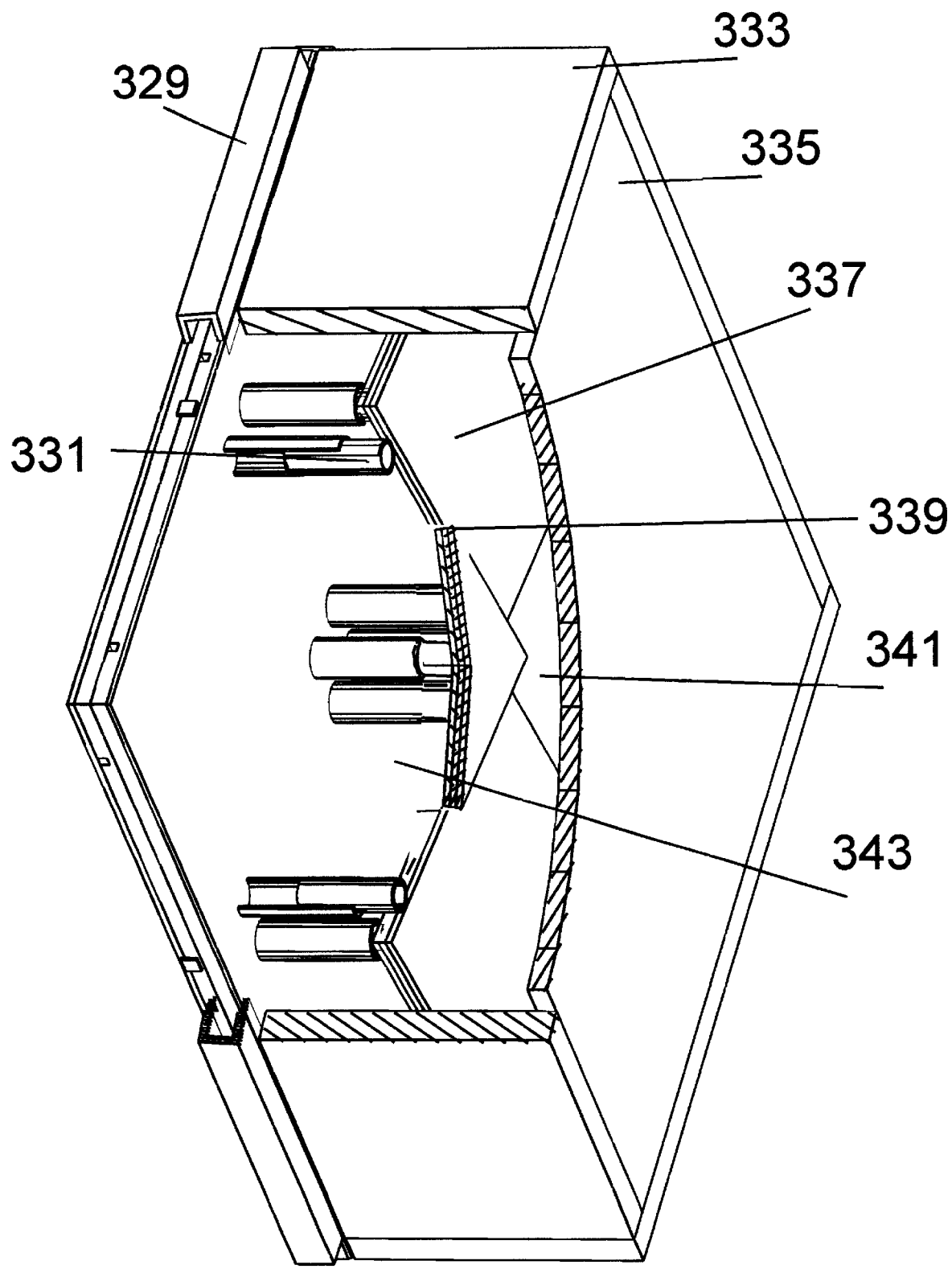

FIG. 32 illustrates a fully assembled version utilizing the alternate membrane of FIG. 31.

Figure 33:
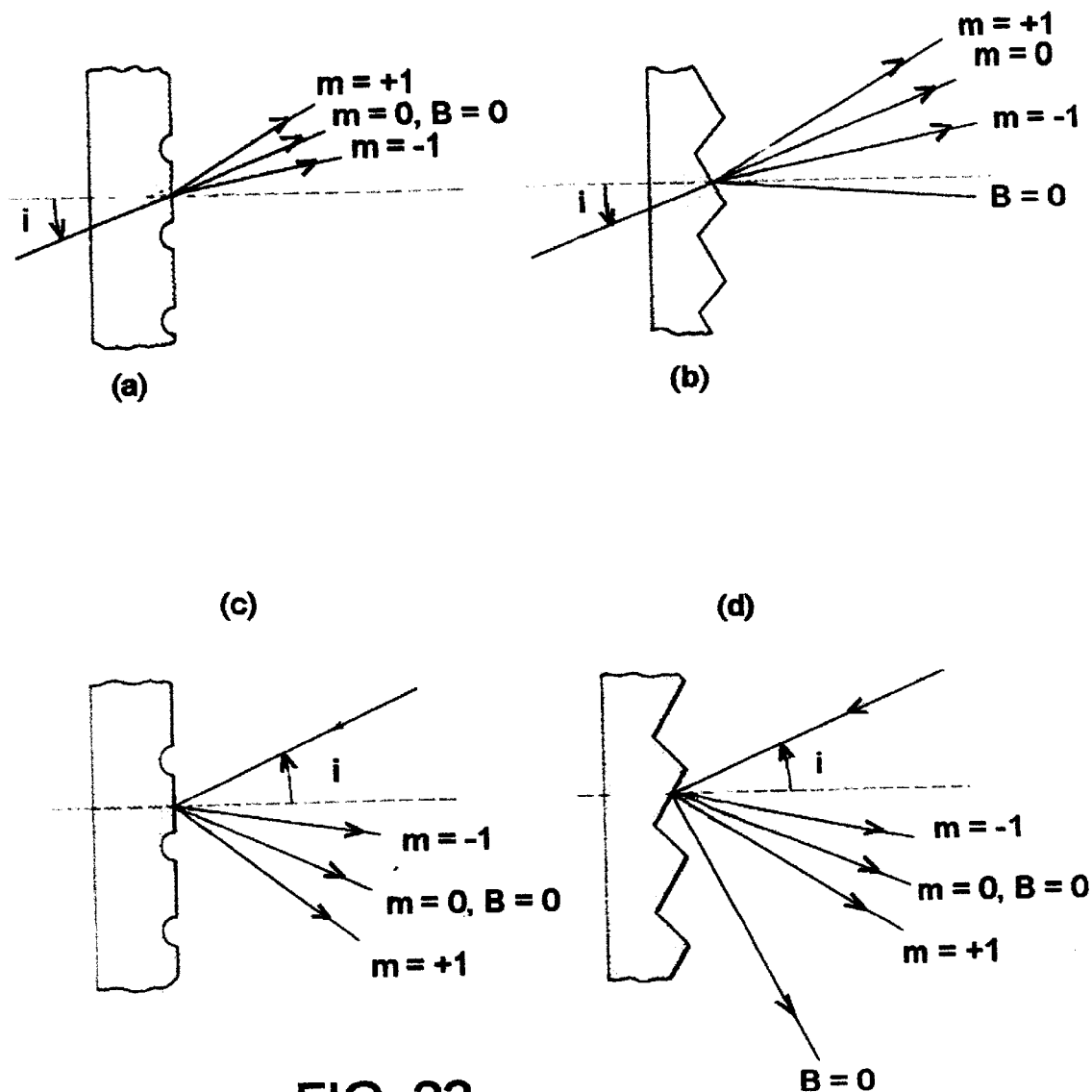

FIG. 33 prior art depicting diffraction gratings.

Figure 34:
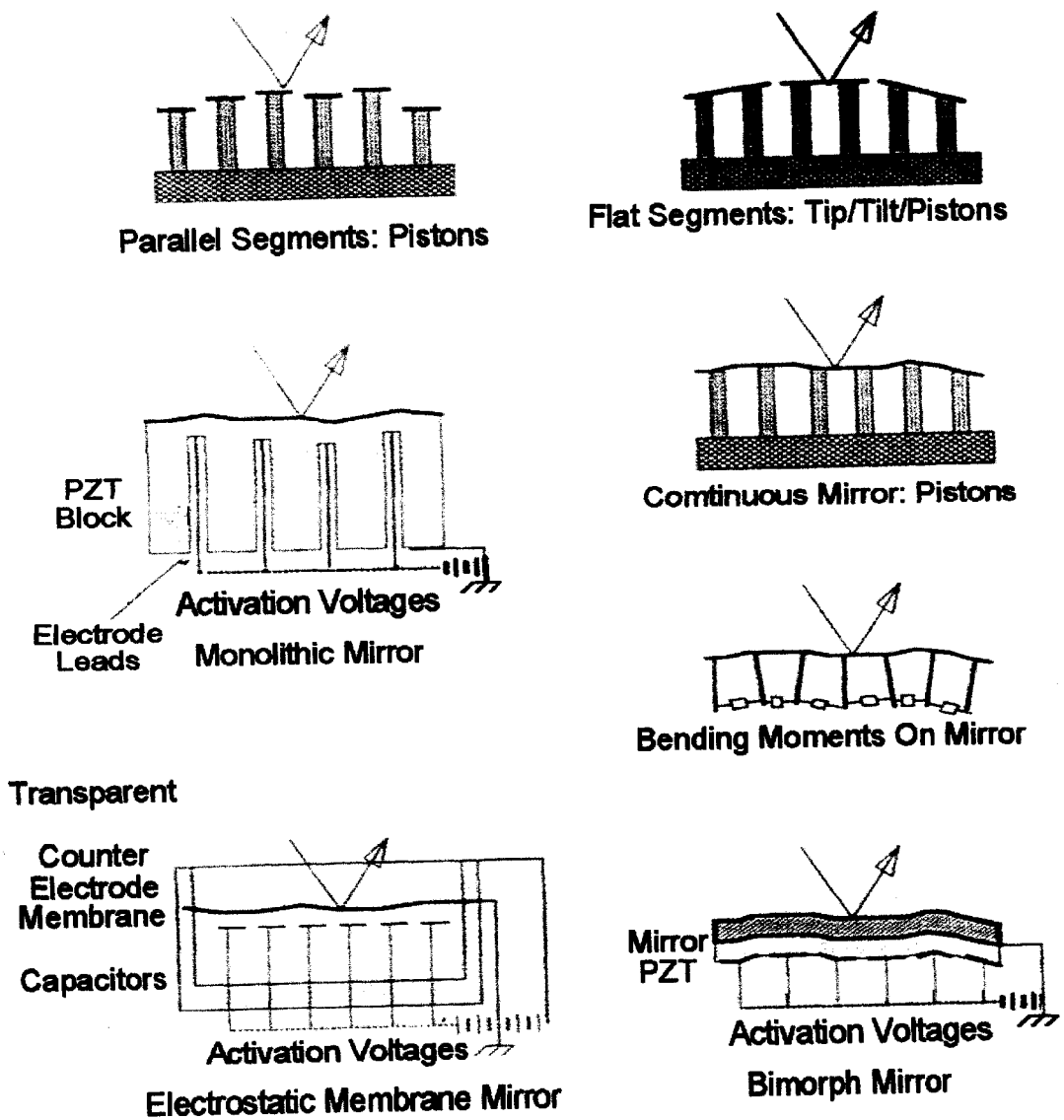

FIG. 34 prior art depicting adaptive optics methodologies.

Figure 35:
Figure 35:
Figure 35:
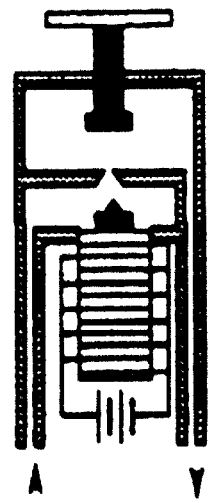
Figure 35:
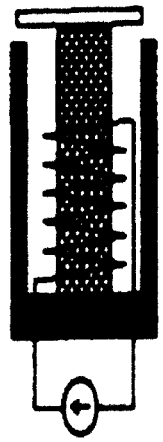
Figure 35:
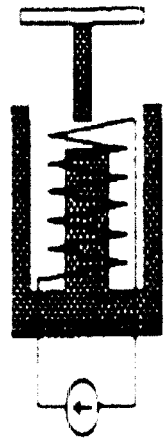
Figure 35:

FIG. 35 prior art depicting actuation means for adaptive optics.

DESCRIPTION OF THE FIGURES IN THE CONCENTRIC CIRCULAR EMBODIMENT

Figure 1:
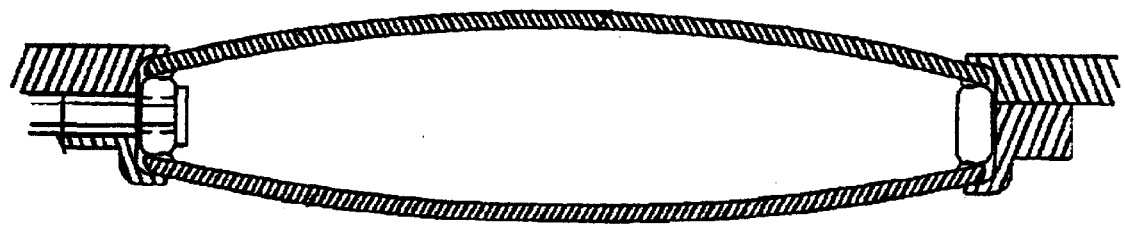
Figure 2:
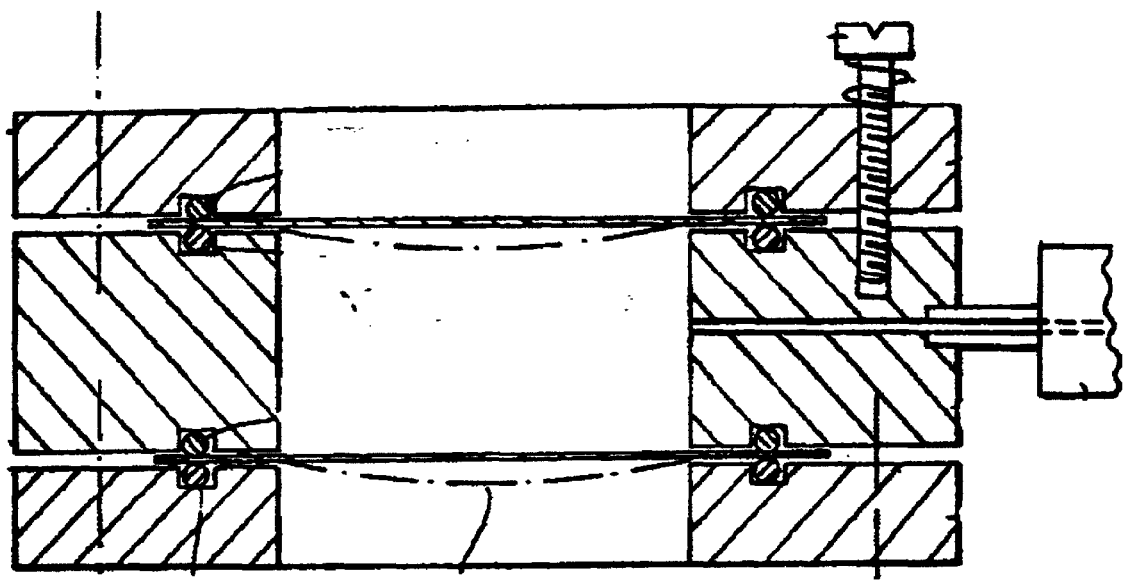
Figure 3:
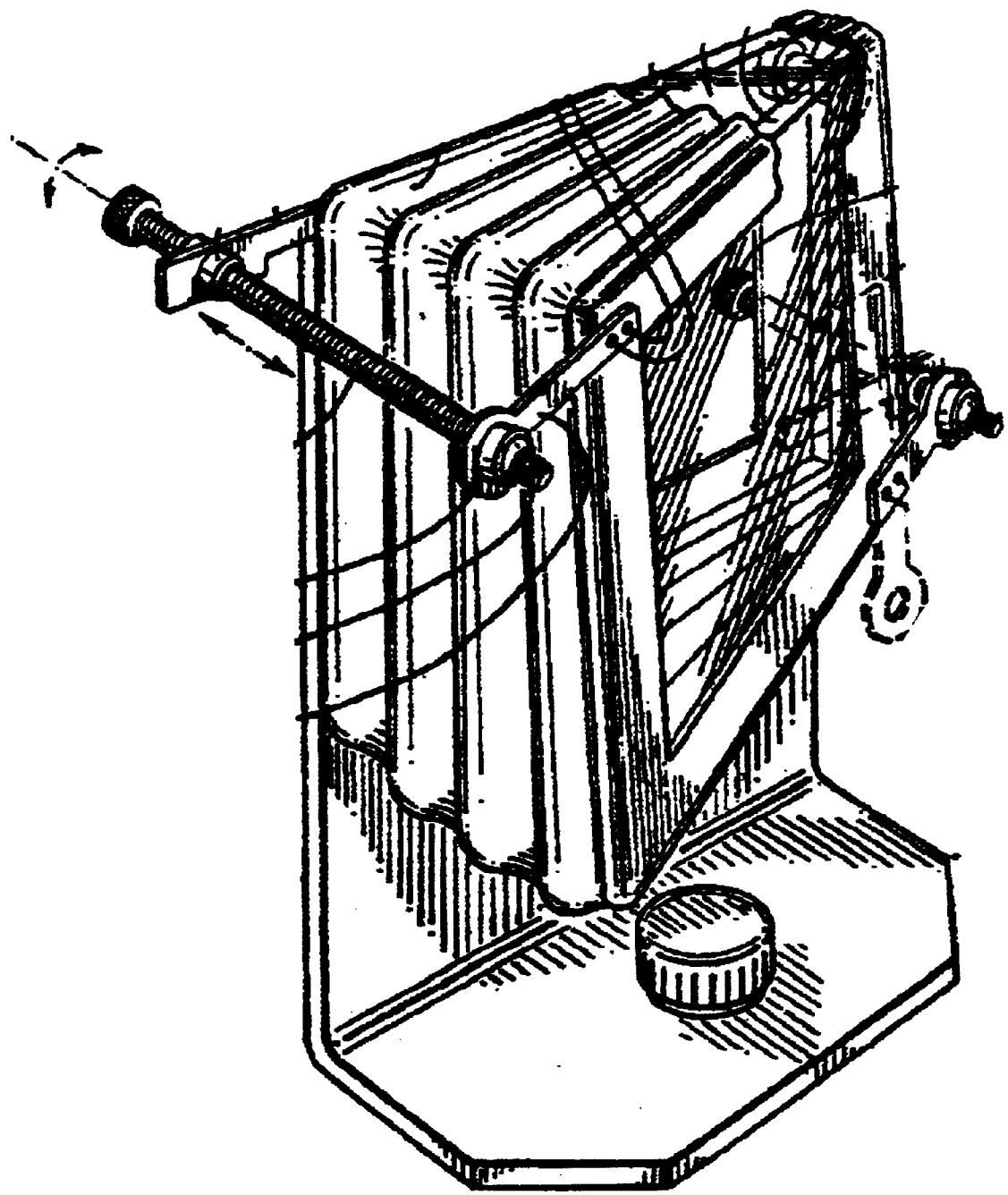
Figure 4:
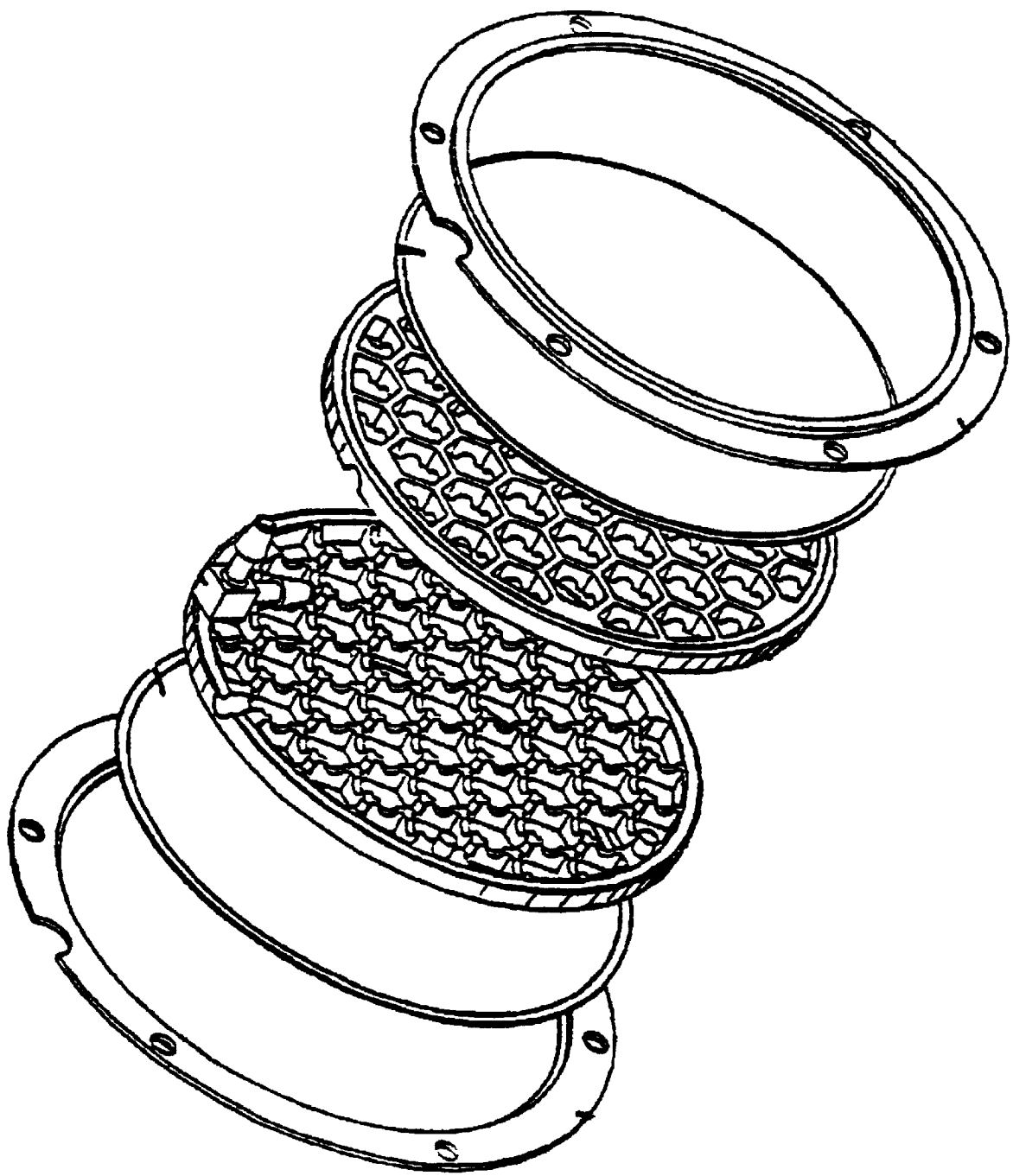
Figure 5:
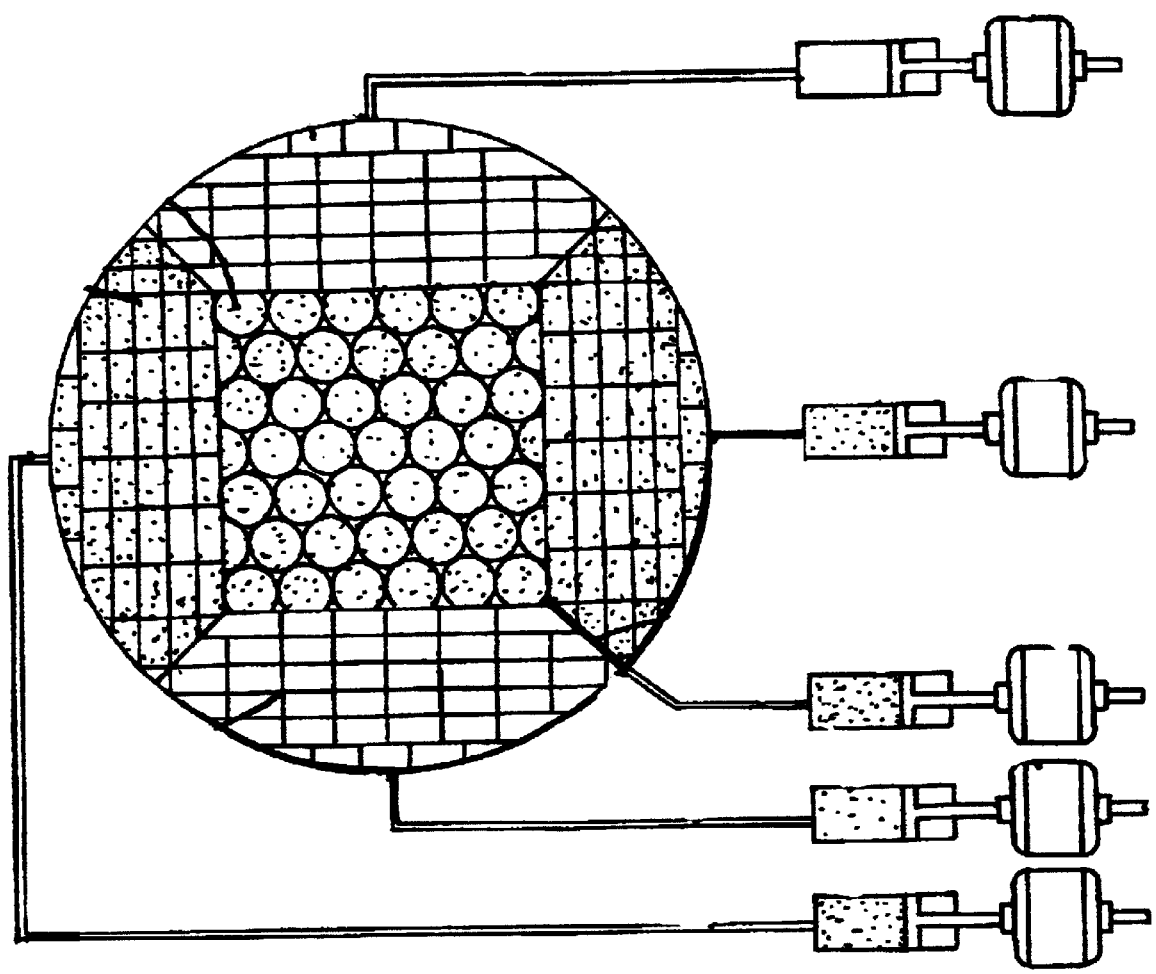
Figure 6:
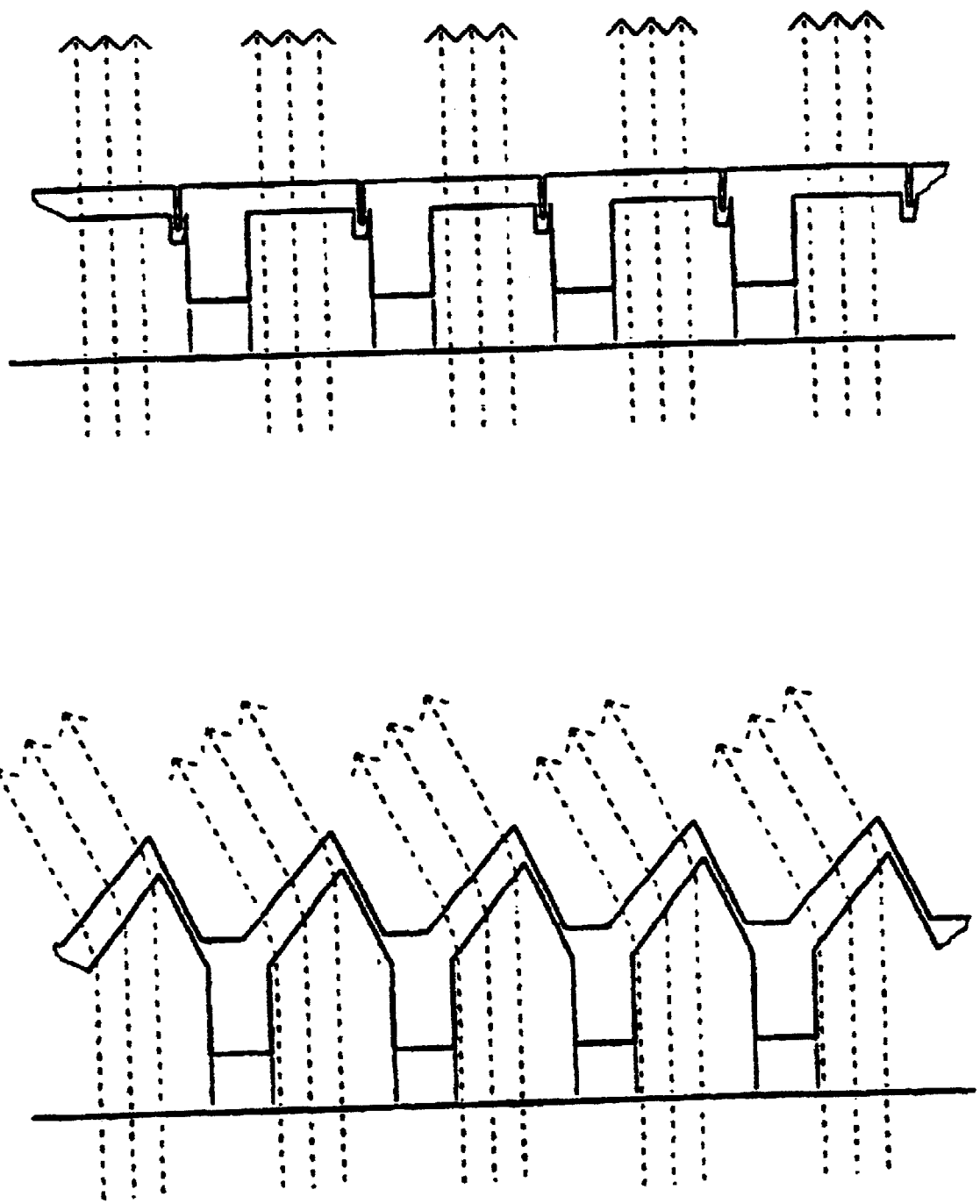
Figure 7:
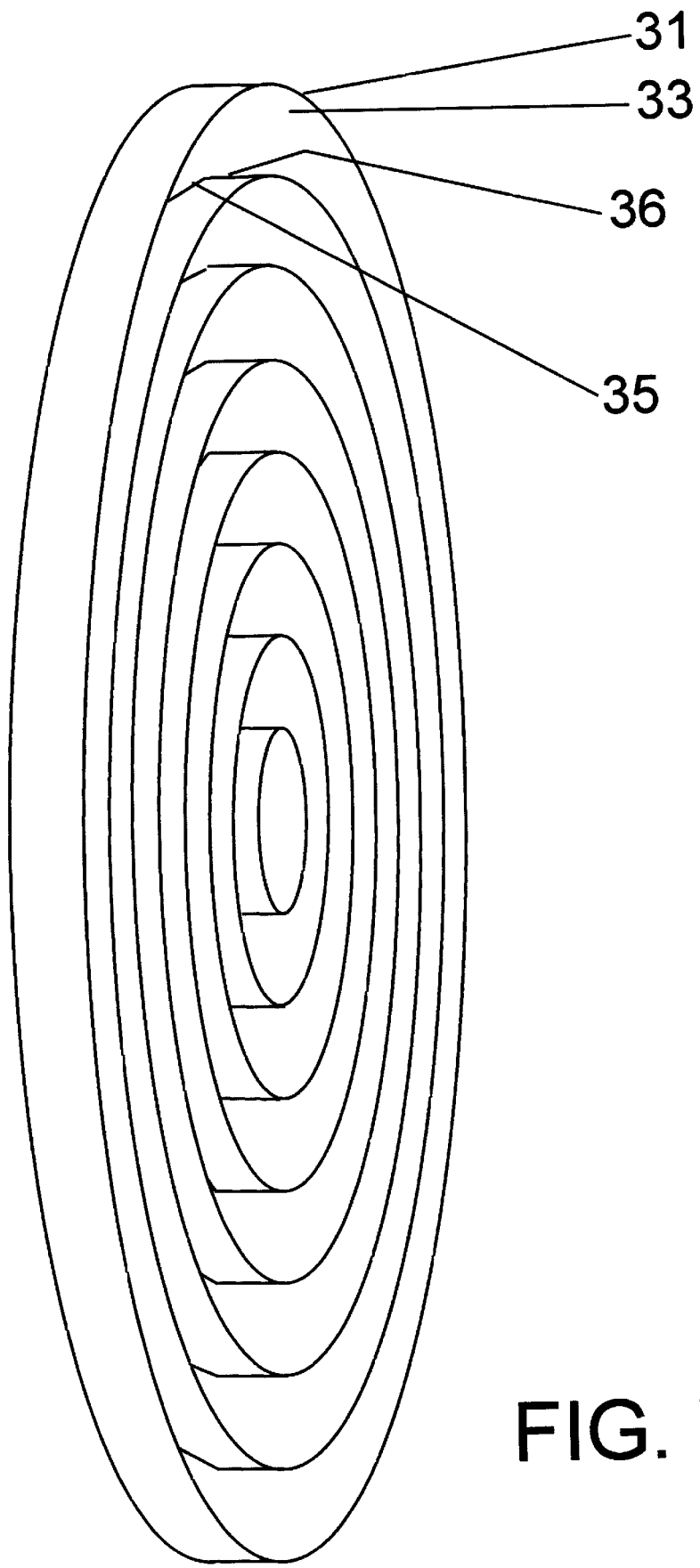

FIG. 7 depicts an optical membrane. The membrane is comprised of a transparent material with elasticity and memory. Polyurethane is one material that can be produced with suitable optical and dynamic properties for this membrane. It can be either extruded and then molded to shape or it can be molded directly into shape. The membrane shape includes a series of peaks similar to a membrane peak 31. A variable Fresnel surface 33 connects the membrane peak to a membrane valley 35. A vertical wall 36 then runs from the membrane valley to the next membrane peak. This pattern is repeated a number of times to form the entire optical membrane. The reverse (non-visible) side of the optical membrane has the exact same features except in reverse.

Figure 8:
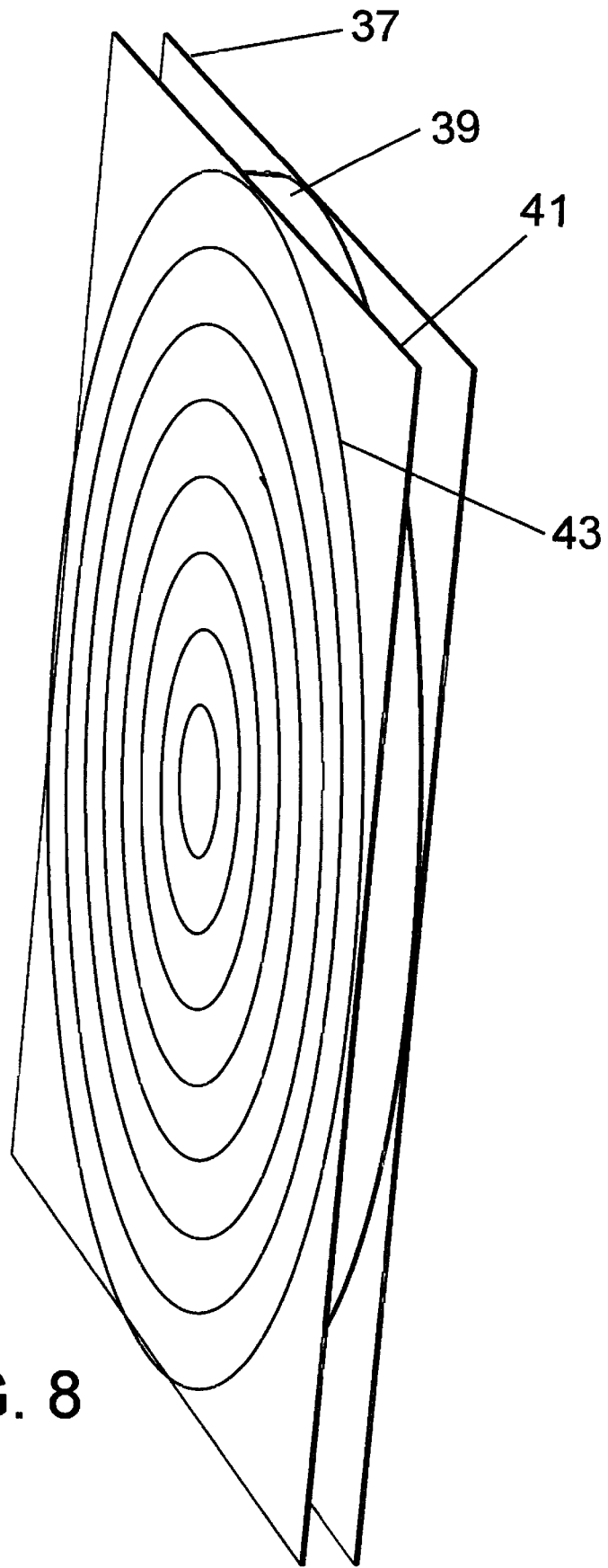

FIG. 8 depicts three membranes welded together. A first welded membrane 37 is a flat extruded sheet of transparent and flexible such as polyurethane. The valleys of a welded optical membrane 39 are heat sealed to the first welded membrane. A second welded membrane 41 is a flat extruded sheet of polyurethane. The peaks of the welded optical membrane 39 are heat sealed to the second welded membrane 41. The process of heat sealing these three components commences at the center and progresses outward. A valley is sealed to the first welded membrane then a peak is sealed to the second welded membrane then a valley is sealed to the first welded membrane. Note that progressing in this alternating manner, all valleys are welded to the first welded membrane and all peaks are welded to the second welded membrane. A circular weld at membrane peak 43 is shown. It and the other shown concentric circles are the heat sealed welds of all of the peaks of the welded optical membrane and the second welded membrane. Each of the aforementioned circular heat sealed welds forms a sealed compartment describing surfaces in concentric circles.

Figure 9:
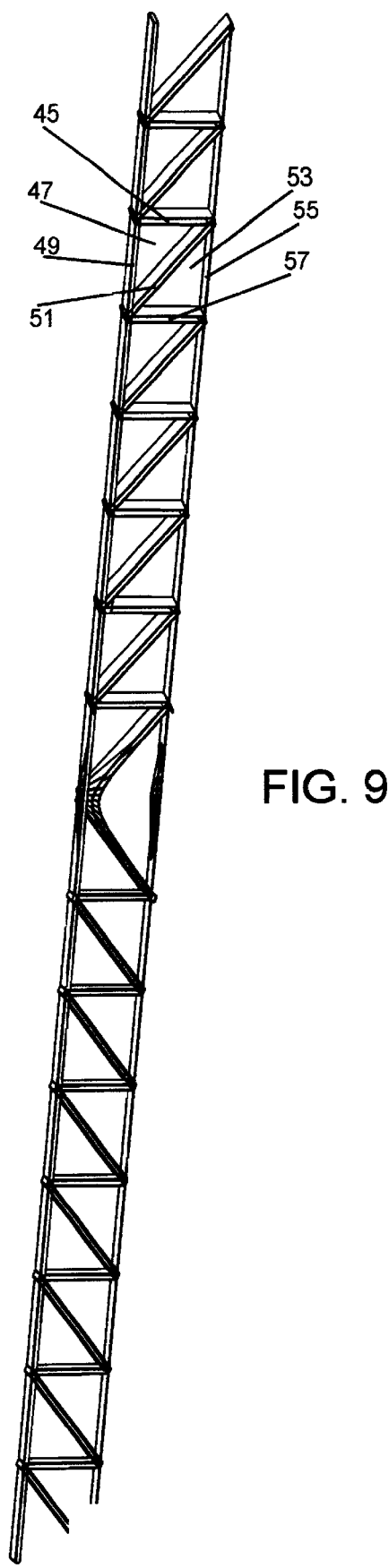

FIG. 9 illustrates a cross section of three membranes welded. This is a slice taken from the center of the three welded membranes of FIG. 8. A vertical wall 45 is formed by the optical welded membrane. It is welded on each end. It forms one wall of the three sided circular chamber 47. A first member wall 49 forms a second side of the circular chamber. A first Fresnel optical membrane wall 51 forms the third side of the circular chamber 47. A series of similarly constructed and shaped circular chambers are formed on this same side of the optical membrane. A opposite circular chamber 53 is similarly formed. It is sealably created between the first Fresnel optical membrane wall 51, a second membrane wall 55 and a second vertical wall 57. A series of chambers are similarly formed on this same side of the optical membrane.

Figure 10:
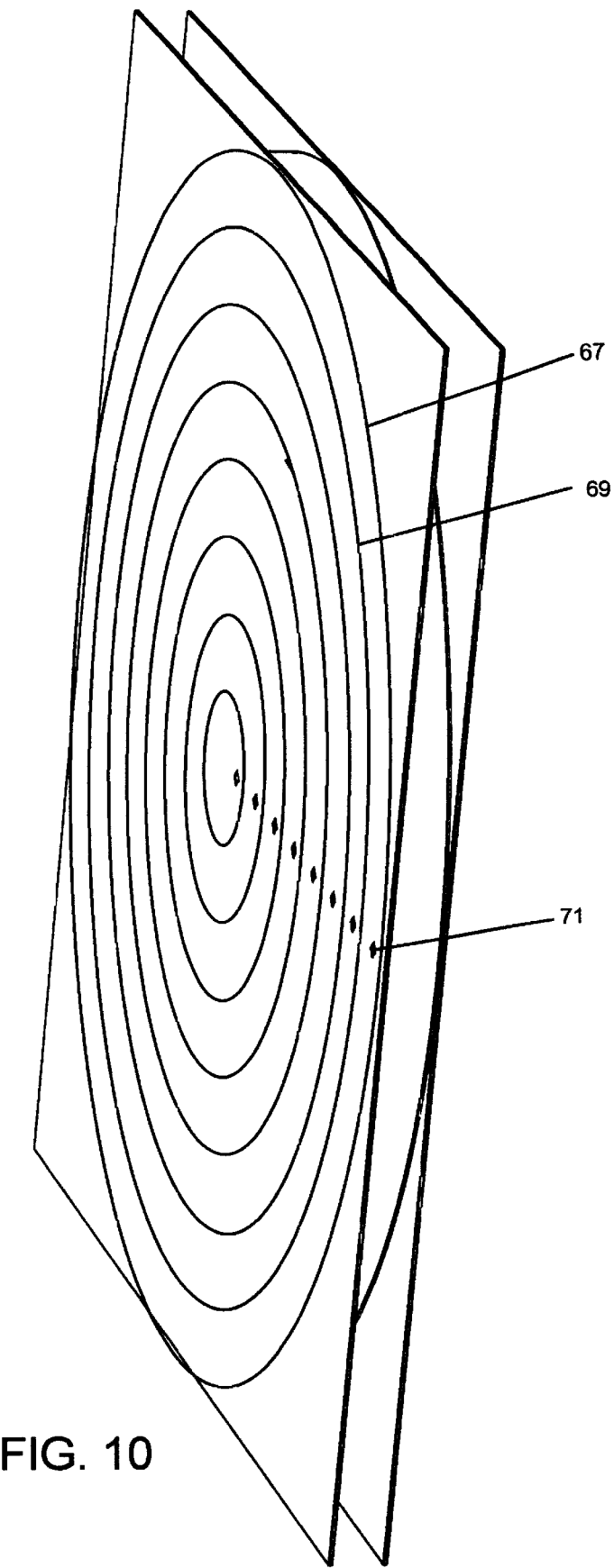

FIG. 10 depicts the welded membranes of FIG. 8 with chamber ports cut through a membrane. A port into circular chamber 71 represents the only means of communicating with the circular chamber housed between a first weld 67 and a second weld 69. As illustrated, each of the other chambers similarly has one respective port through which communication to the interior is possible.

Figure 11:
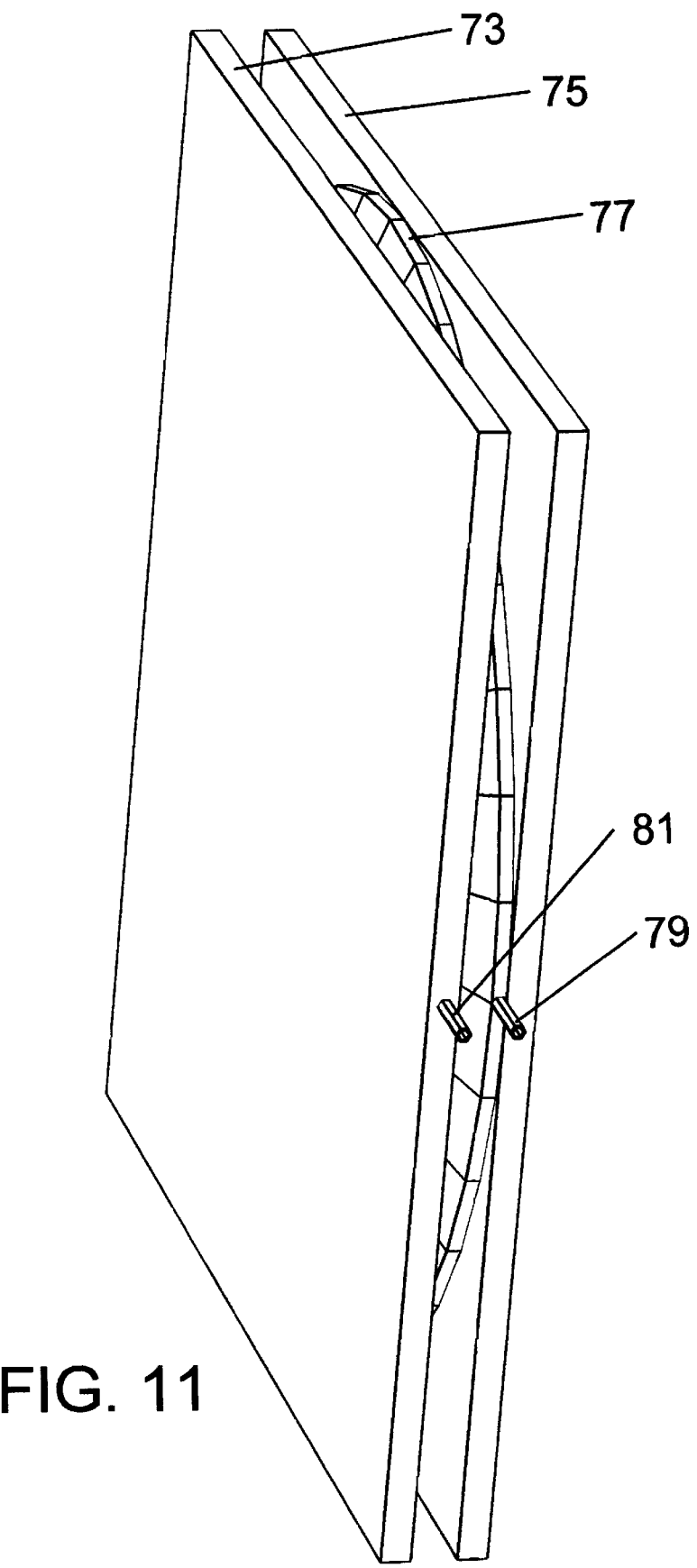

FIG. 11 shows an assembled, two valve unit. A first rigid member 73 has been glued to one side of the welded membrane assembly. The first rigid member is a piece of transparent glass and it is glued with a transparent glue to the welded membrane assembly. Similarly, a second rigid member 75 is glued to the other side of the welded membrane assembly. It too is a transparent piece of glass. The optical membrane installed 77 can be seen between the two rigid members. A membrane piercing channel 79 is protruding from the optical membrane. This is a flexible polyurethane tube which has sealably been welded in place such that it communicates with all of the circular chambers on one side of the optical membrane. It provides an alternate methodology to communicate with the chamber interiors. In this application it is used to communicate with one side of the optical membrane. An alternate means of communicating with the chamber interior is illustrated by a rigid member piercing fluid channel 81. The method of creating this means of communication is further discussed later. Each of the fluid channels include a protruding male end to enable a female supply hose (not shown) connection to occur.

Figure 12:
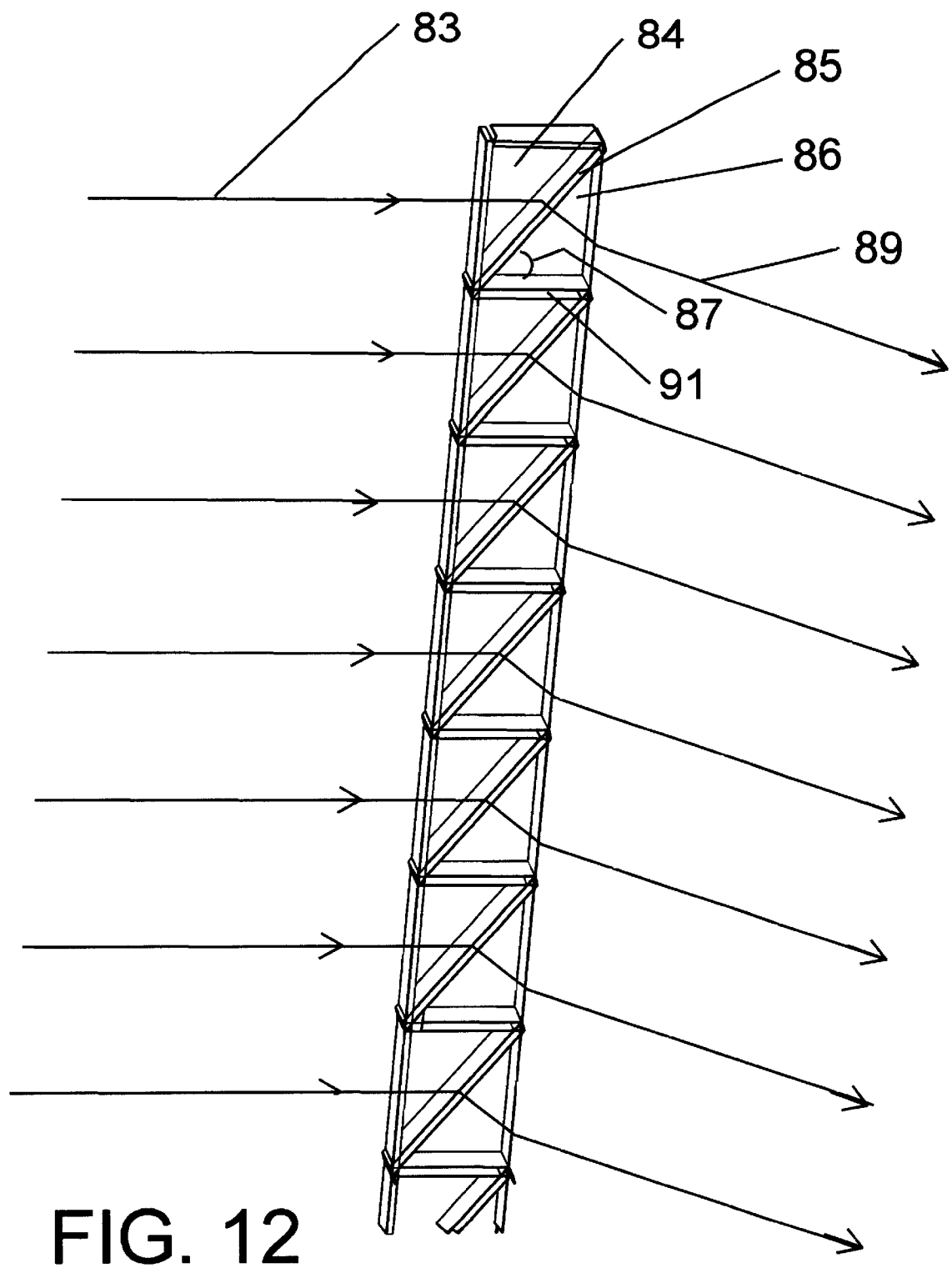

FIG. 12 illustrates light refraction through a multiple surfaced cross-section. A incident light ray 83 passes through a first fluid with a first refractive index. In this illustration, the first refractive fluid has a refractive index near 1.00. The light ray then passes through an optical Fresnel membrane cross section 85. The optical Fresnel membrane cross section 85 creates the separation of the first fluid from a second fluid 86. The optical member cross section also defines the angle at which light traveling though the unit will leave the first fluid and enter the second fluid. In this illustration, the second fluid has an index of refraction great than that of the first fluid. The light ray is therefore refracted in accordance with Snell's law. A resultant light ray 89 is accordingly bent to a new trajectory. Note that other rays entering the system on similar trajectories are also similarly refracted. A variable angle 87 is described between the optical Fresnel membrane and the elastic wall 91.

Figure 13:
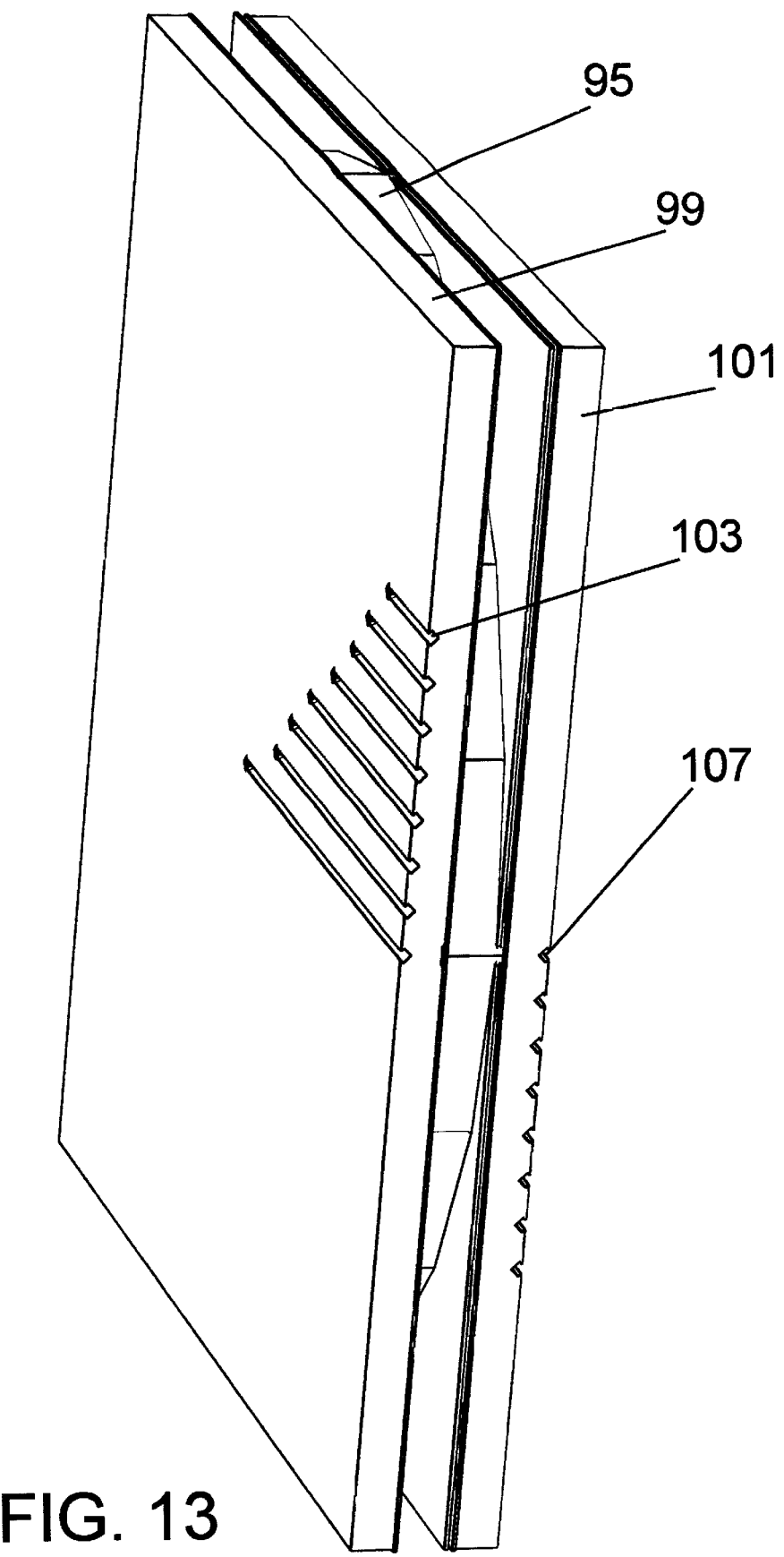

FIG. 13 illustrates a multi-valve unit semi-assembled. All of the components are identical to those previously discussed with one exception. The previous unit had one supply channel for each of the two refractive fluids, such that one channel connected all of the chambers on one side and a second channel connected all of the chambers on the second side. This two channel system enabled delivery of one fluid to one side at a first pressure and the second fluid to the second side at a second pressure. The provided the means to create a pressure differential between the two sets of concentric circular chambers. In contrast, the unit of FIG. 13 includes individual channels to communicate with each respective sealed chamber and thus the means to vary the pressure differential in each respective chamber. A welded membrane assembly 95 has been glued between a first channeled member 99 and a second channeled member 101. These channeled members are transparent glass with channels cut into one surface. Additionally, at the interior end of each channel a hole has been drilled through the first channeled member and the membrane glued thereto such that each hole communicates with one circular chamber as previously defined. A first channel 103 has been called out as one such channel of the first member and a second channel 107 has been called out as one of the series on the second member.

Figure 14:
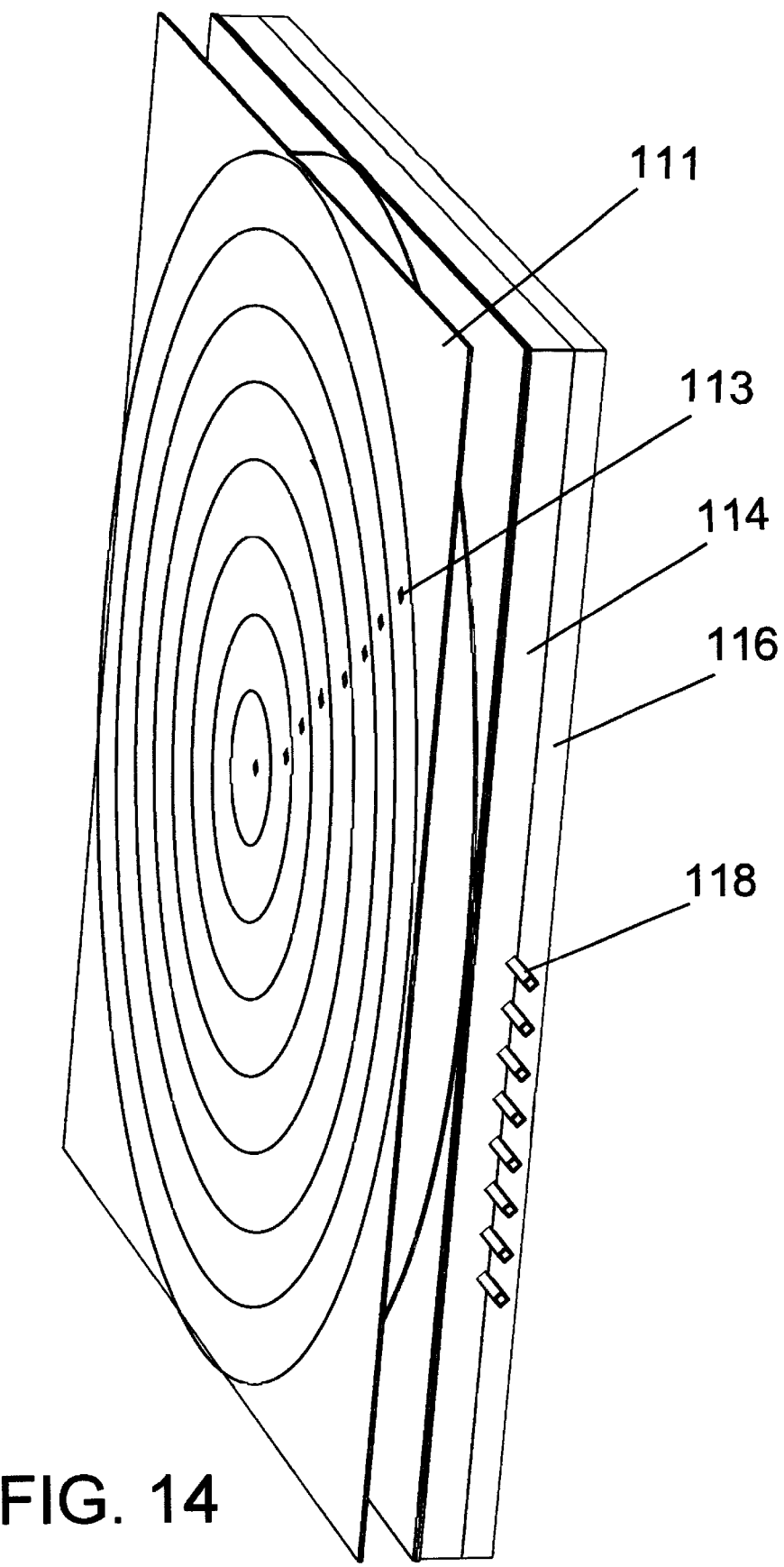

FIG. 14 illustrates holes through the membrane for multi-valve unit. This is the same structure as FIG. 13 with the first member removed to reveal the membrane pierced for multi-valves 111. The holes go through the one membrane such that each communicates with the interior of one circular channel. A Membrane port 113 is one such hole. On the other side of the membrane assembly, a laminated channeled member 114 has been glued to an additional rigid member 116. This additional rigid member is a transparent glass. It has been added to sealably form a wall for all of the channels that were previously described. A connection tube 118 provides a means to hook a female tube up to the assembly, through which communicating fluid to the respective circular channel is possible. The other channels have been similarly fitted with a male member.

Figure 15:
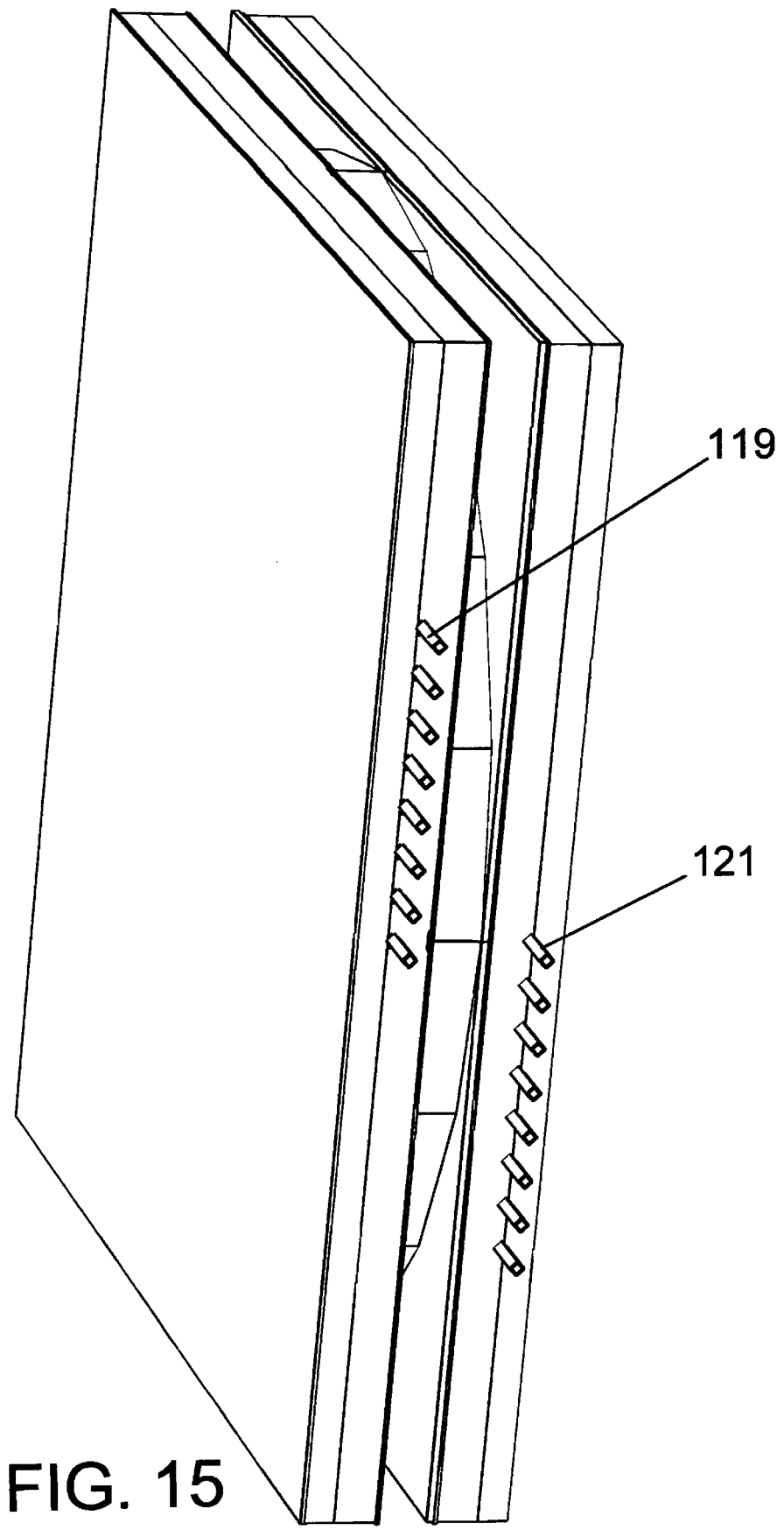

FIG. 15 depicts a multi-valve unit fully assembled. A first fluid connection tube 119 has been sealably inserted into one of the previously described channels. It enables communication with one circular chamber. Each of the other tubes likewise communicates with one circular chamber. A second fluid connection tube 121 has been called out as a representative of the tubes on the other side of the membrane structure.

Figure 16:
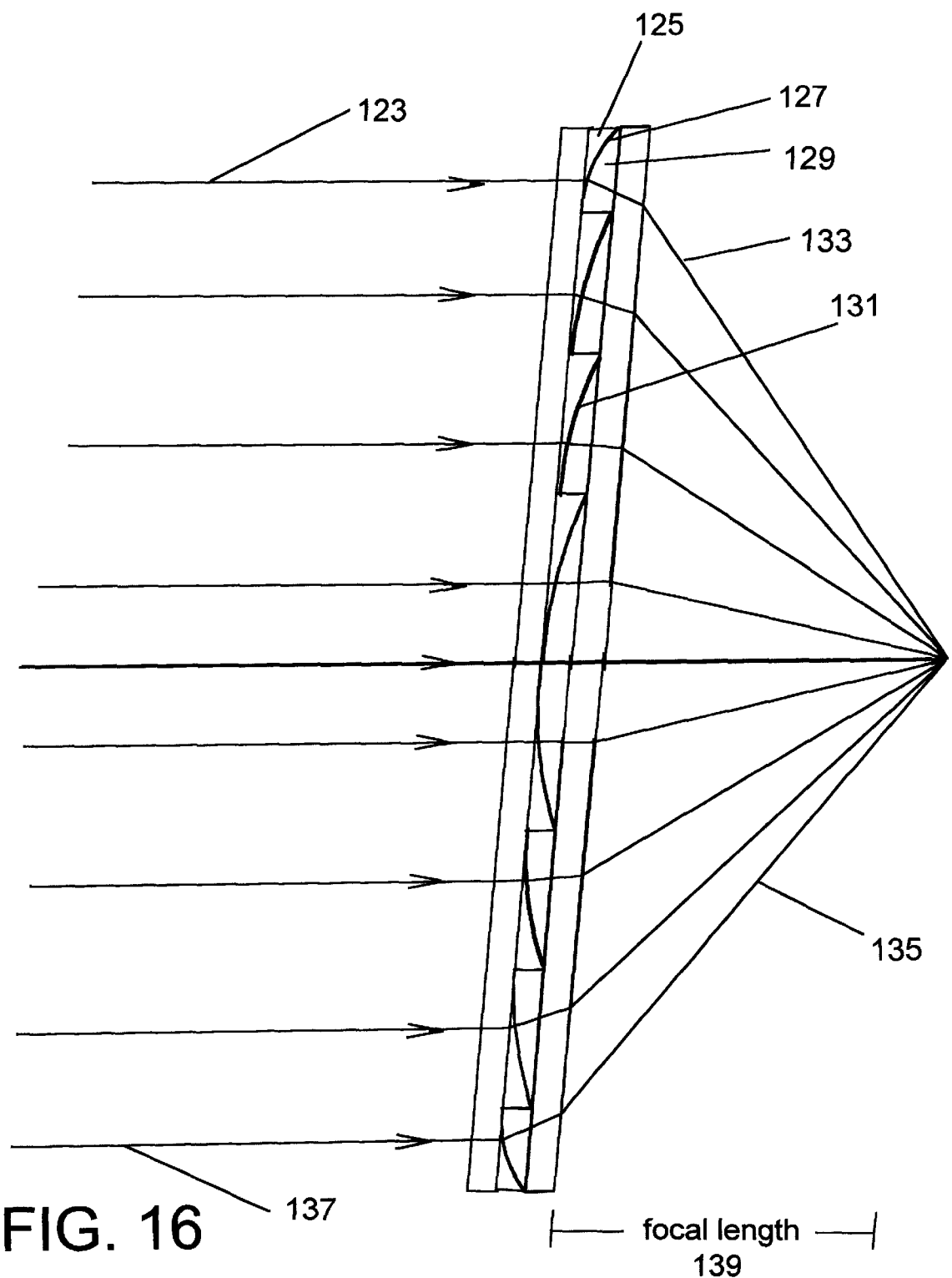

FIG. 16 illustrates ray tracing through the optical components of a multi-valve unit. A second incident ray 123 passes through a chamber with first fluid 125. This chamber contains a fluid with a first refractive index. In this illustration, the refractive index would be slightly greater than 1.00 (such as air). The light ray is then incident upon a first Fresnel optical membrane curved surface 127 whereupon it is bent according to Snell's law. It then enters the chamber with second fluid 129. Fluid in this chamber is assumed to have a refractive index higher than that in the first chamber. The ray is refracted according to Snell's law into a new trajectory as a refracted ray 133. The curvature of the first optical membrane curved surface is caused by introducing a relative positive pressure in the chamber with second fluid. This pressure mismatch causes the first optical membrane curved surface to bend away from the chamber of relative high pressure into the chamber of low pressure. The individually specific curvature of each individual chamber wall is possible due to the fact that each circular chamber is individually supplied with fluid by its own port and channel as previously described. Accordingly a second optical membrane curved surface has a different curvature than does the first optical membrane curved surface. This is because the pressure differential on each side of the wall of the second optical membrane curved surface are different than the pressure on opposite sides of the first optical membrane curved surface. A third incident ray 137 is called out to illustrate that it will be refracted at the negative of the first example (123). This is because they are each responding to the mirror image of the other's curvature. They are on the opposite sides of the optic center but they are actually the same circular chamber (180 degrees apart). A focal length 139 has been created by adjusting the pressures of each circular chamber such that a convergent lens is created. The focal length can be adjusted by a process of calculating the curve required in each chamber to achieve a desired focal length and then creating each of these curves through pressure differentials and actuating the rigid members closer together or further apart to control the optical membrane angle pitch (the FIG. 12 variable angle 87) as needed.

Figure 17:
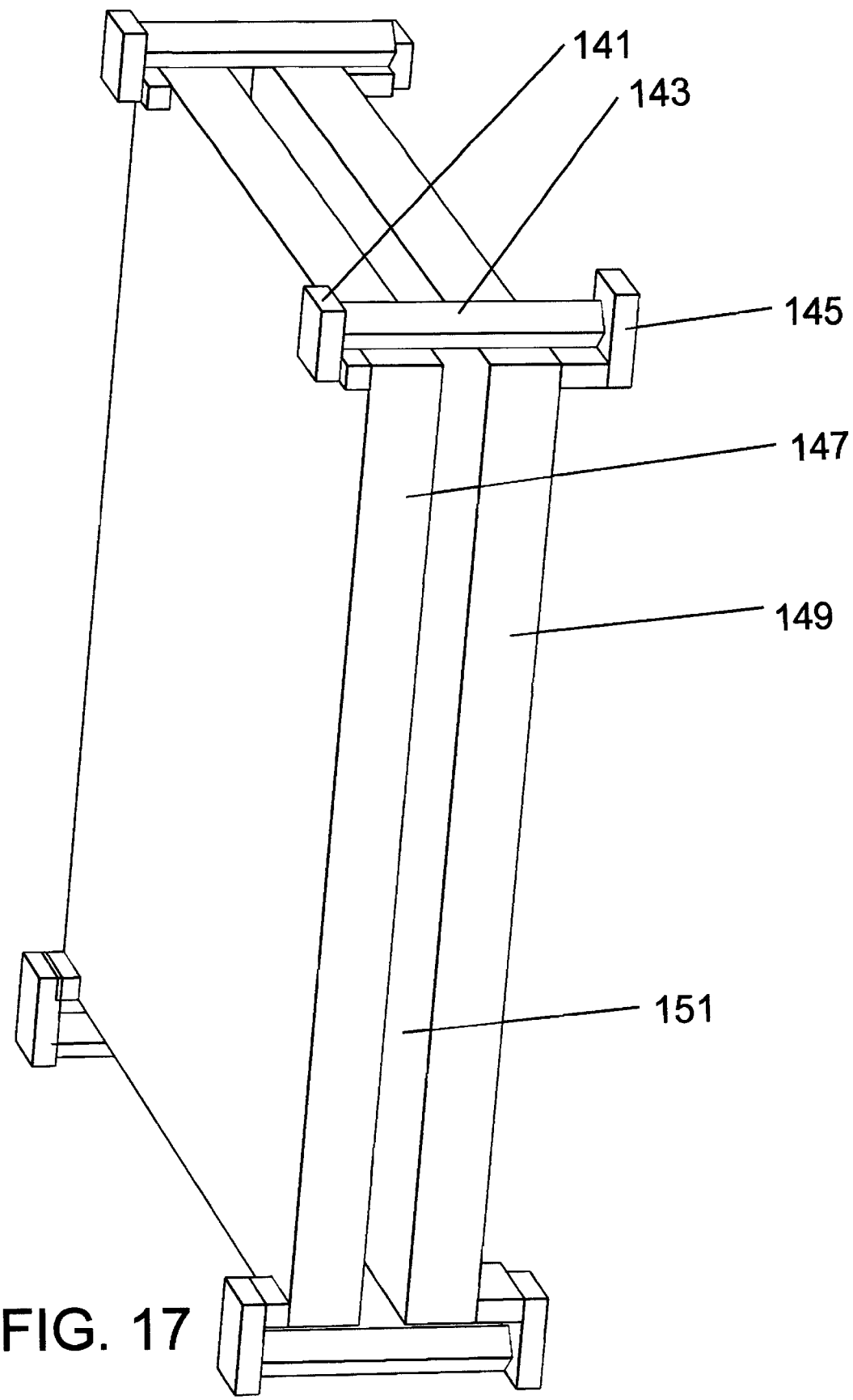

FIG. 17 illustrates additional system actuation means. A first actuated rigid member 147 represents the transparent glass that has been previously described. Similarly a second actuated rigid member is the same transparent glass previously described. A first set of cylinder hardware 141 and a second set of cylinder hardware 145 each connect one end of a cylinder 143 to a corner of the two rigid members. A actuated optical void 151 resides between the two rigid members. Note that this optical void can be increased and decreased by using the cylinder (or the others similar) to push the two rigid members apart. Likewise the void can be decreased by using the cylinder to pull the rigid members together. The cylinder is a pneumatic as other the others depicted.

Figure 18:
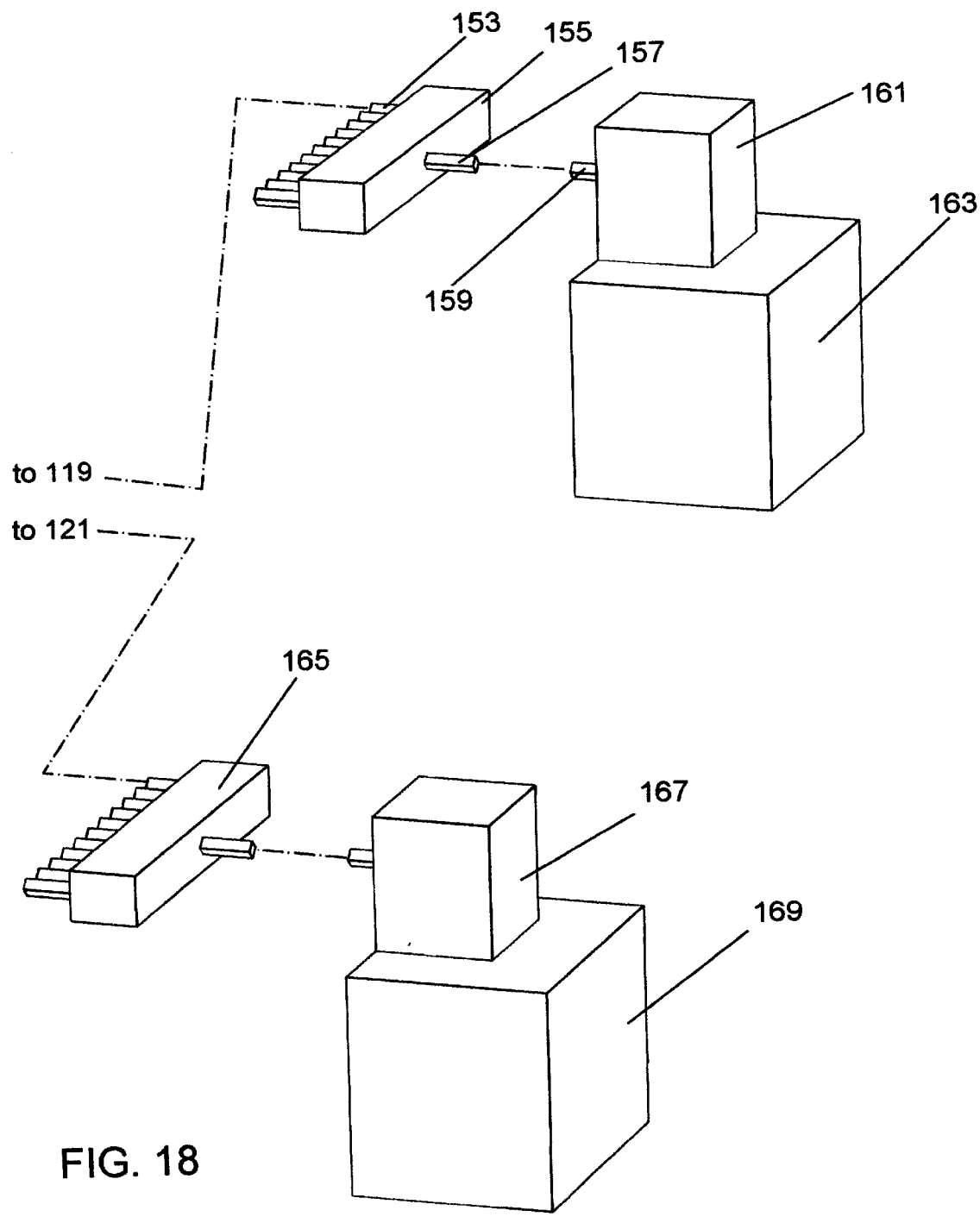

FIG. 18 additional hardware required. A first injection tube 153 is a male tube similar to those projecting from the multi-channel unit previously described. A hose (not shown) connects this injection tube to one of the tubes on the (FIG. 15) multi-channel unit. Each of the other tubes depicted here are similarly connected by hoses (not shown) to one of the tubes on one side of the (FIG. 15) multi-channel unit previously discussed. The first injection tube is connect to a first distributor 155. This distributor handles one of the two fluids previously discussed. It controls how much pressure is provided to each of the respective circular chambers and thus helps determine the curvature of each of the individual circular chambers. The first distributor has a first distributor tube 157 which receives positive or negative pressure from a first pump 161 via a first pump tube 159. Excess fluid of one type is kept in a first reservoir 163. Combined, these apparatus help determine the slope of the prism surfaces on the optical surfaces and the curvature of the lens surfaces on the optical surfaces. Similarly, controlling the second fluid's volume and pressure within the welded assembly are a second distributor 165, a second pump 167, and a second reservoir 169. It should be noted that on the two valve unit, a direct connection from the first pump to one side of the optical membrane and a second connection from the second pump to the other side of the optical membrane is possible (assuming a pressure regulator is built into the pump assembly). No distributor is needed to control pressure individually in each of the curved chambers.

Figure 19:
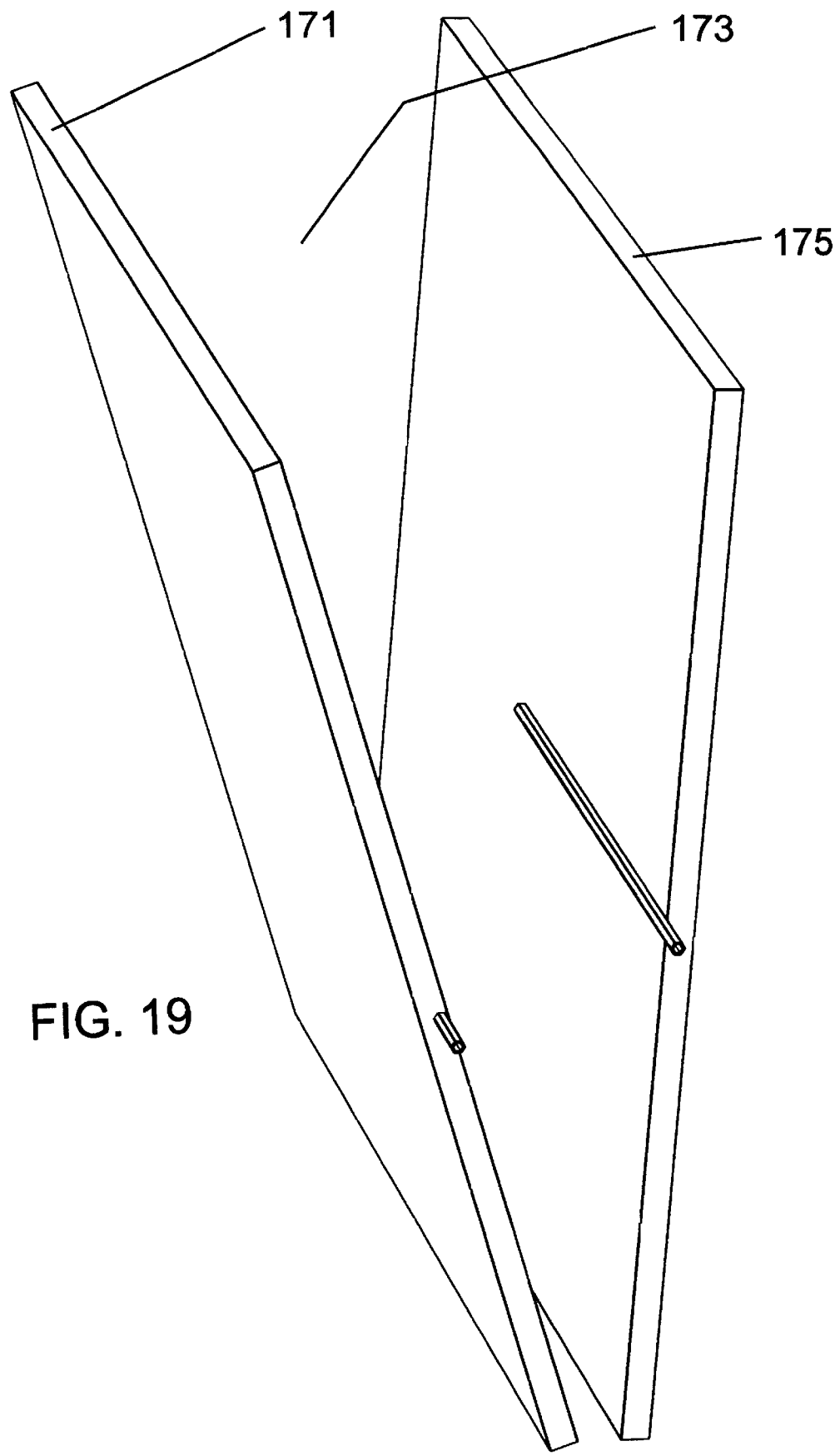

FIG. 19 depicts non-parallel surfaces. Heretofore all of the examples are herein described rigid members that were largely actuated such that they remained parallel. Using the cylinders of FIG. 17, the rigid members can be actuated into non-parallel planes. A 171 first non-parallel member is actuated away from a second non-parallel member. This configuration creates desirable ray directing effects within the welded membranes (not shown) normally residing within the angular void 173.

Figure 20:
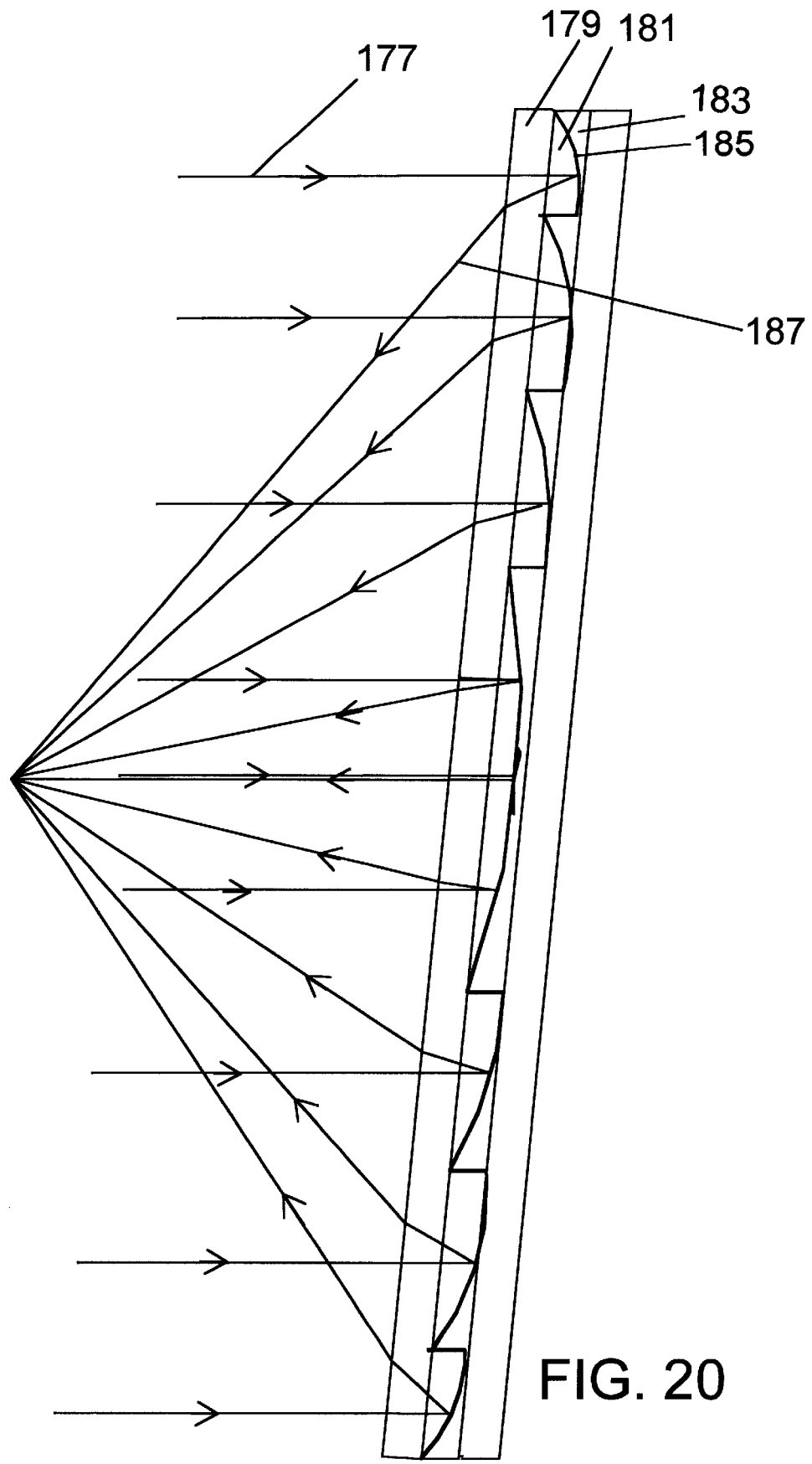

FIG. 20 depicts a Fresnel variable mirror. It is constructed of concentric circular structures similar to that is FIG. 7 except that it describes a reflective surface. An incoming ray 177 passes through a rigid transmissive member 179. The rigid transmissive member forms one side of a positive pressure gas in concentric chamber 181. This positive pressure is on one side of a reflective Fresnel membrane 185. This together with the negative pressure gas in concentric chamber 183 on the opposite side of the reflective membrane causes the membrane to bend into a Fresnel surface focusing mirror. A resultant reflected ray 187 joins the other rays at a focus point. The focal length is variable by varying the distance of the two rigid members from one another and varying the pressure on either side of the membrane. Each concentric chamber's pressure can be independently controlled.

Figure 21:
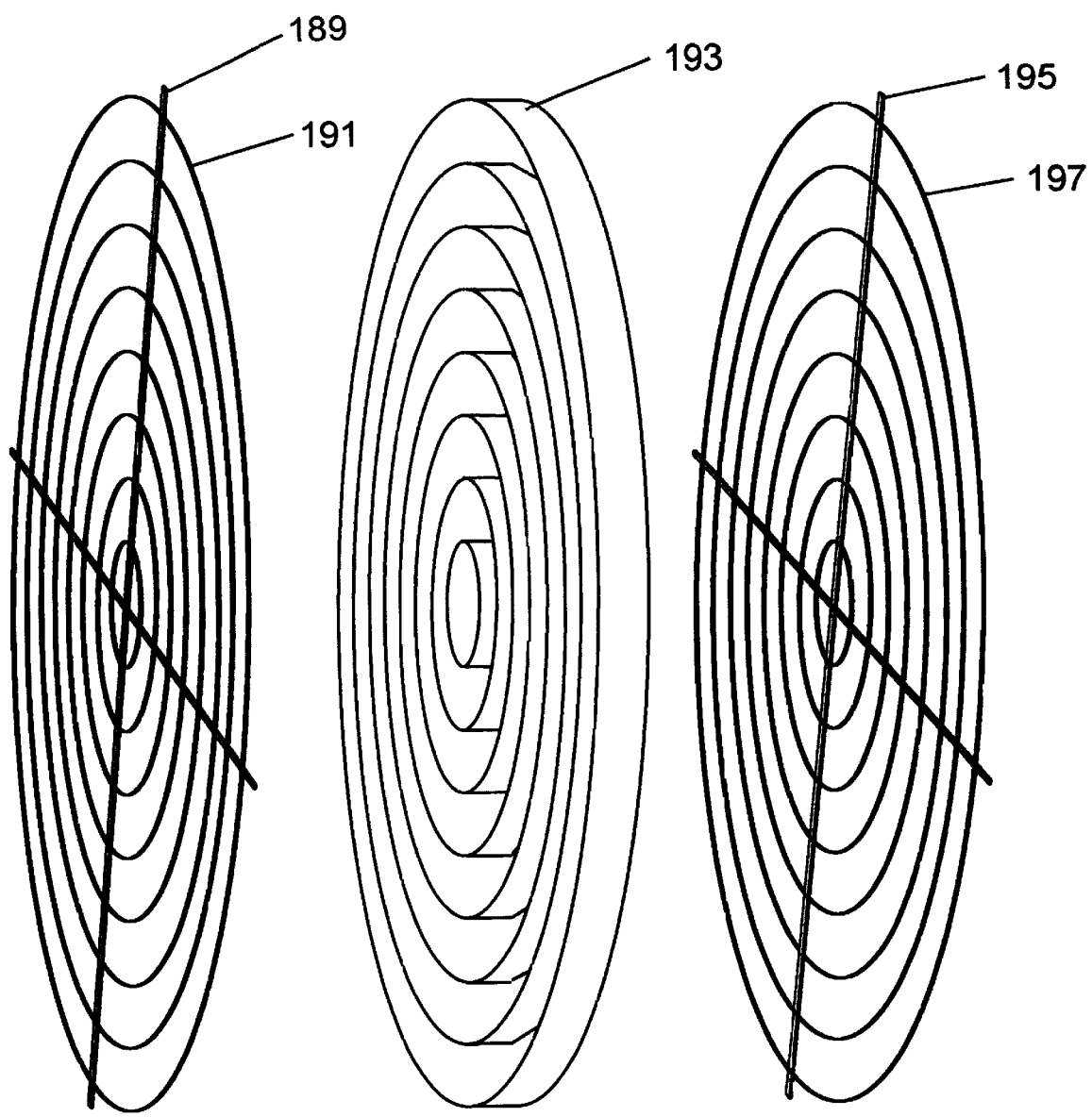

FIG. 21 depicts alternate rigid transmissive members. A first actuation flange 189 is rigidly connected to a series of rigid concentric circular structures including a first rigid circular support 191. Each of these concentric circles are attached to the peaks of a alternate Fresnel optical membrane 193. Likewise, on the opposing side of the alternate Fresnel optical membrane 193, an actuation flange 195 is rigidly connected to a corresponding first circular support 197. The point of disclosing this structure is that a rigid member consisting of concentric circular structures can be used as an alternate to the flat transparent utilized in previous diagrams. A concentric circular transmissive structure can also be used on only one side of the Fresnel optical membrane with the flat rigid transparent member being used on the other side of the optical membrane. This is desirable because it enable better control of cell curvature.

Description of the Figures in the Parallel Surface Embodiment

Figure 22:
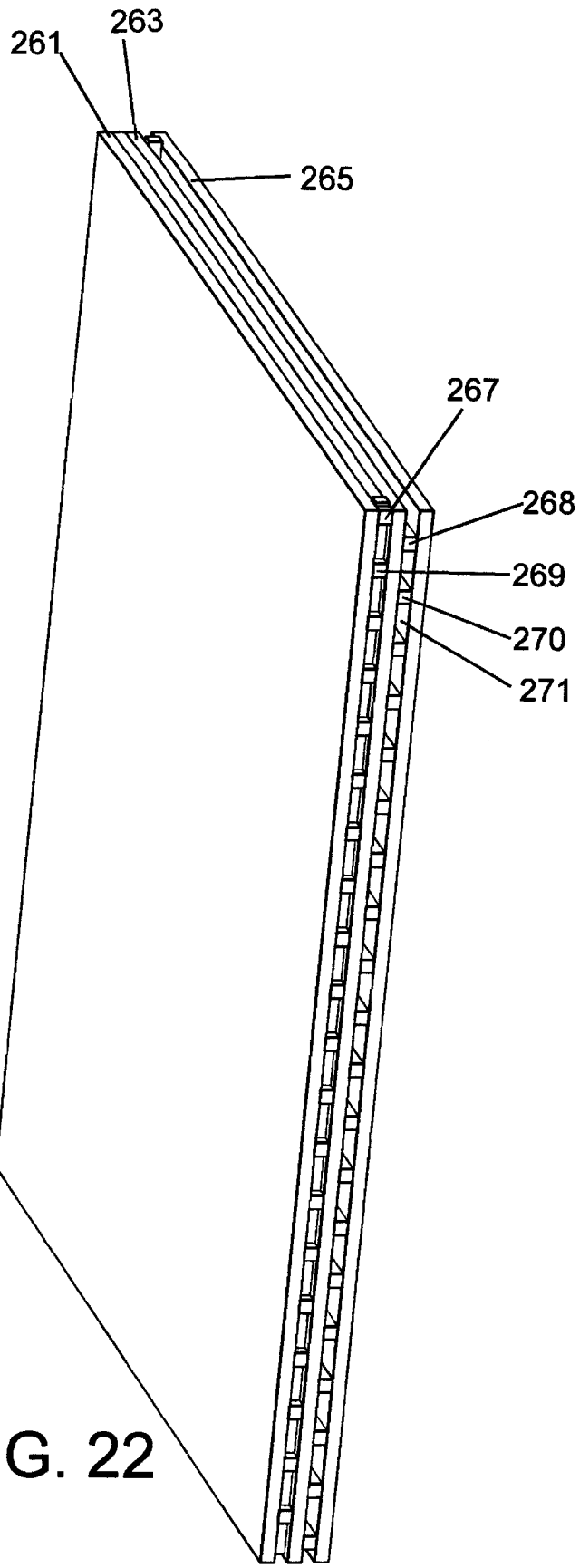
FIG. 22 illustrates a product of a manufacturing process for making variable prismatic surfaces in the parallel embodiment.

FIG. 22 illustrates a product of a manufacturing process for making variable prismatic surfaces. A transparent sheet 261 is welded to elastic sheet 263 with first weld 267. A second transparent sheet 265 is welded to elastic sheet 263 with second weld 268. A series of welds similar to third weld 269 further connect transparent sheet 261 to elastic sheet 263. A series of welds similar to fourth weld 270 further connect transparent sheet 265 to elastic sheet 263. The welds as described form a series of voids similar to void 271. The voids on one side of elastic sheet 263 being open on only one end of the assembly and the voids on the other side of elastic sheet 263 being open only on the opposite end of the assembly. Transparent sheet 261, elastic sheet 263 and second transparent sheet 265 are transparent in the visible light spectrum. The welds are performed by a process such as heat welding and sealably attach the respective sheets together except where there are openings as have been described above. Elastic sheet 263 has a shape memory such that it can repeatedly be stretched and will return to its original shape. It may be manufactured from a material such as transparent polyurethane or latex.

Figure 23:
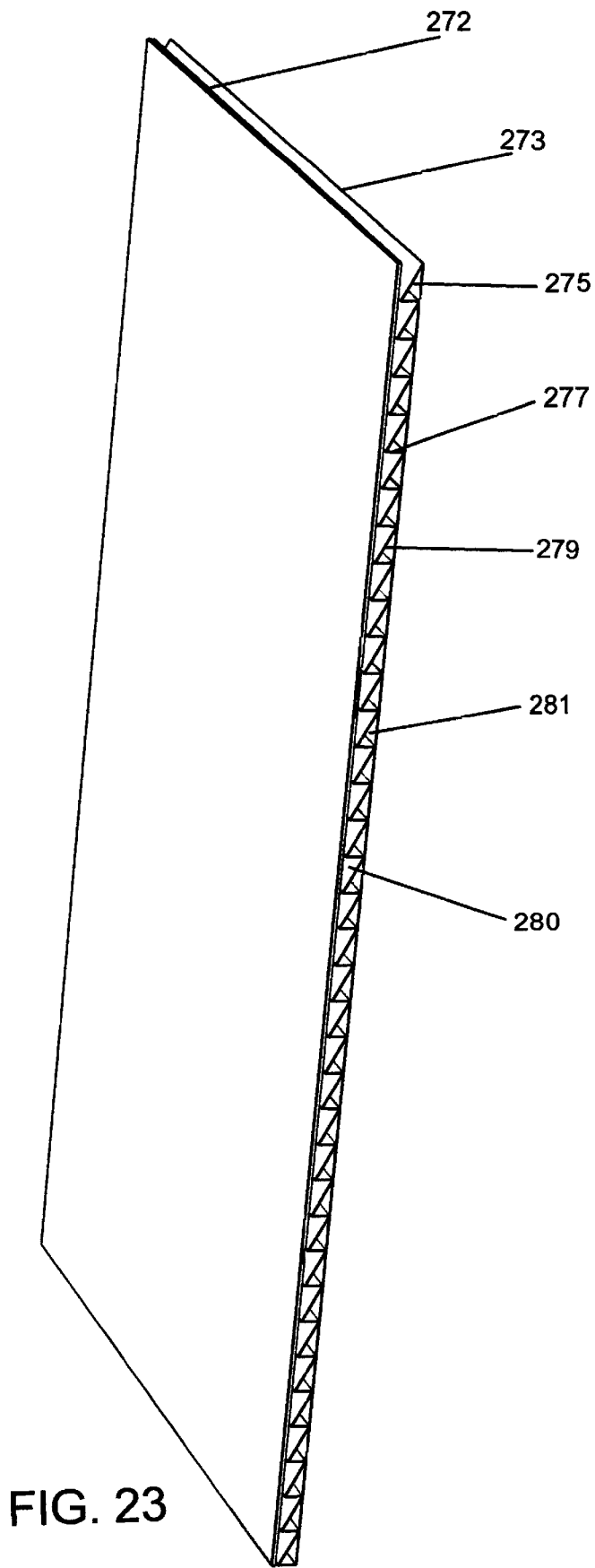
FIG. 23 illustrates the components of FIG. 22 that have been actuated to form prismatic surfaces.

FIG. 23 illustrates the components of FIG. 22 that have been actuated to form prismatic surfaces. Alt transparent sheet 272 has been actuated away from alt second transparent sheet 273. Moving these two sheets apart causes a series of prismatic surfaces to form similar to prismatic surface 275 in elastic sheet 279. A second series of surfaces similar to normal surface 277 in elastic sheet are also formed when alt transparent sheet 272 is actuated away from alt second transparent sheet 273. The transparent sheets, prismatic surfaces and normal surfaces define two sets of voids. A series of positive voids similar to positive void 280 are formed which communicate with one side of the assembly and a series of negative voids similar to negative void 281 are formed which communicate with the other side of the assembly. When actuated, these voids are filled with fluids with refractive indices. A fluid with a first refractive index fills all of the voids on one side of the elastic sheet. A fluid with a second refractive index fills all of the voids on the opposite side of the elastic sheet. Sheet 272 and sheet 273 can be slid (vertically in the illustration) relative to each other such that the angle formed by the normal surface 277 is adjustable to be either positive or negative and parallel with a desired viewing angle.

Figure 24:
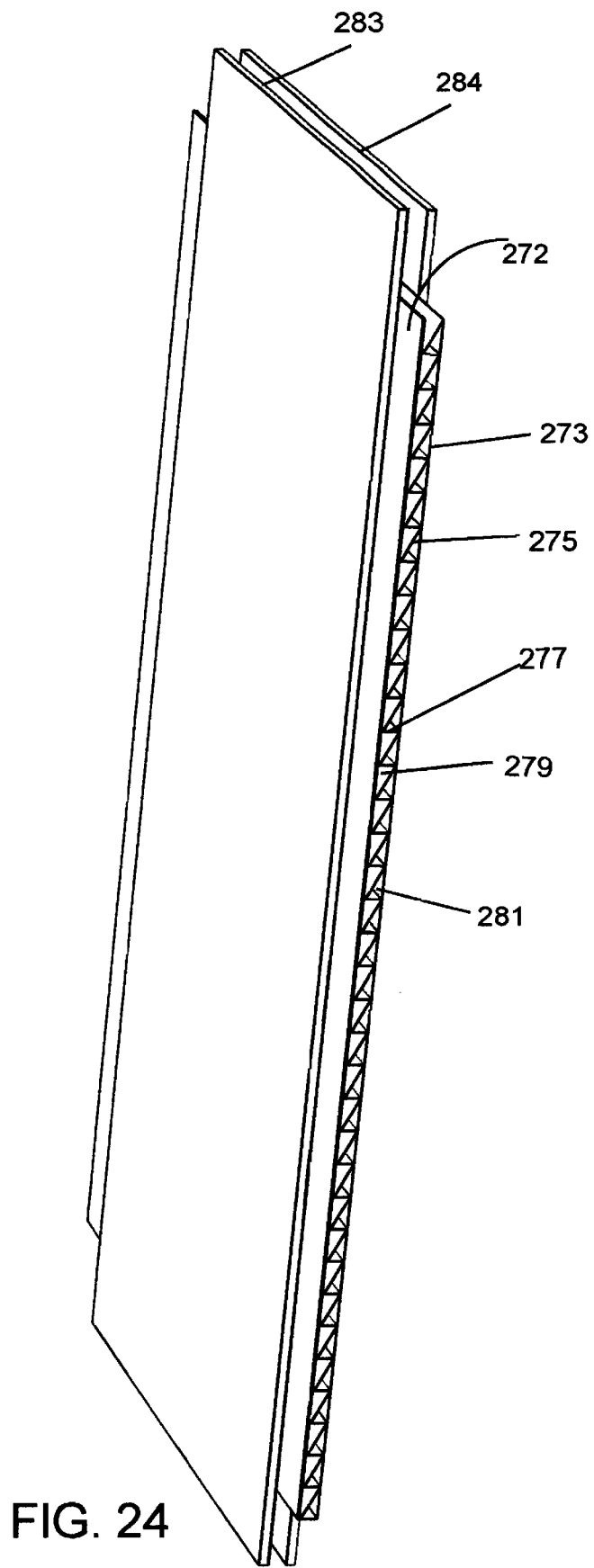
FIG. 24 depicts the components of FIG. 23.

FIG. 24 depicts the components of FIG. 23. A rigid plane 283 is sealably attached to one outer surface of the FIG. 23 assembly. A second rigid plane 284 is sealably attached to the opposite outer surface of the FIG. 23 assembly. These rigid planes are made of a rigid material such as glass or plastic which is transparent in the visible spectrum but may filter other wavelengths of electromagnetic energy. The rigid planes provide a means to actuate and maintain desirable positions of the FIG. 23 components.

Figure 25:
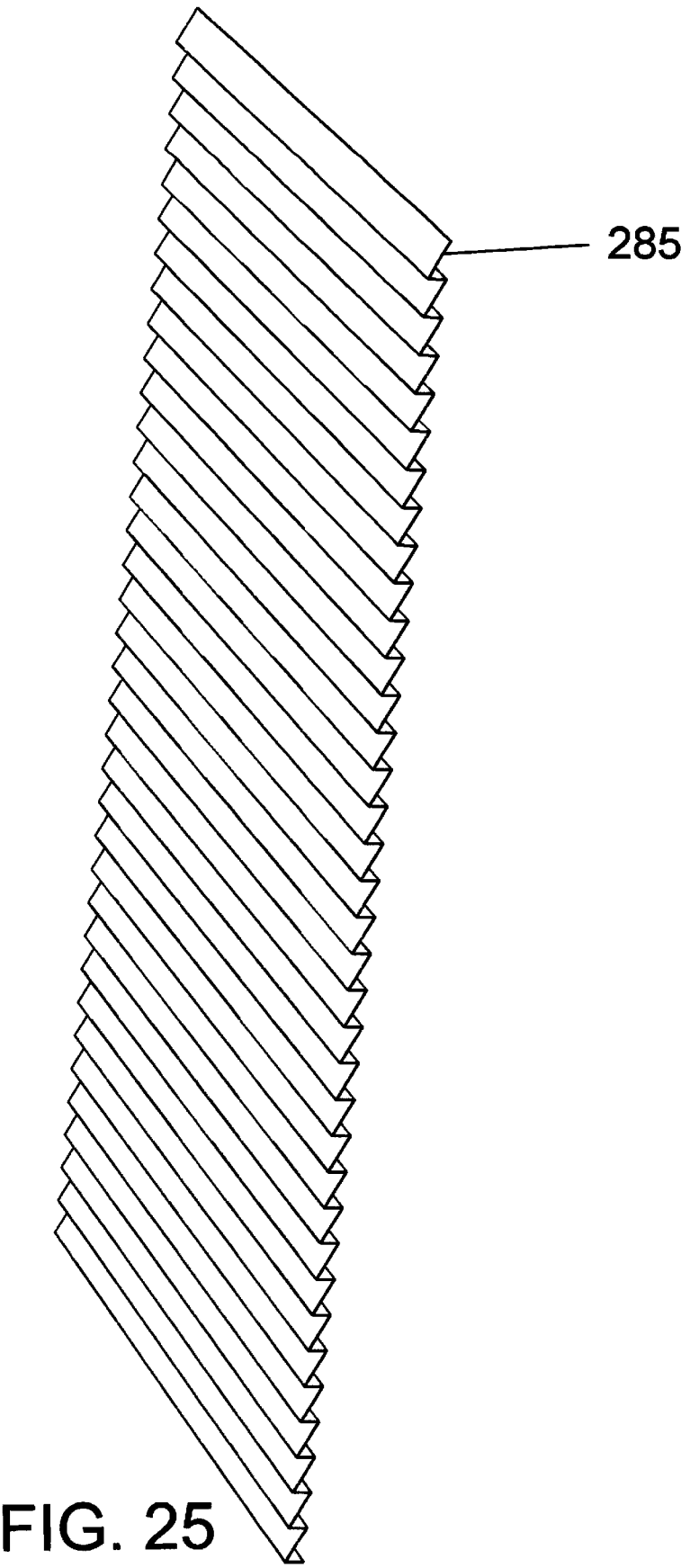
FIG. 25 depicts elastic sheet 285 of FIG. 24 forming parallel Fresnel surfaces when actuated.

FIG. 25 depicts elastic sheet 285 of FIG. 24 forming prismatic surfaces when actuated. In practice two such sheets are used together with three refractive fluids to achieve refraction and minimize dispersion according to this invention. (The ray tracing in FIG. 17 helps to illustrate polychromatic light entering a first prism, being dispersed and exiting a second prism with two colors traveling on parallel trajectories to minimize chromatic distortion.)

Figure 26:
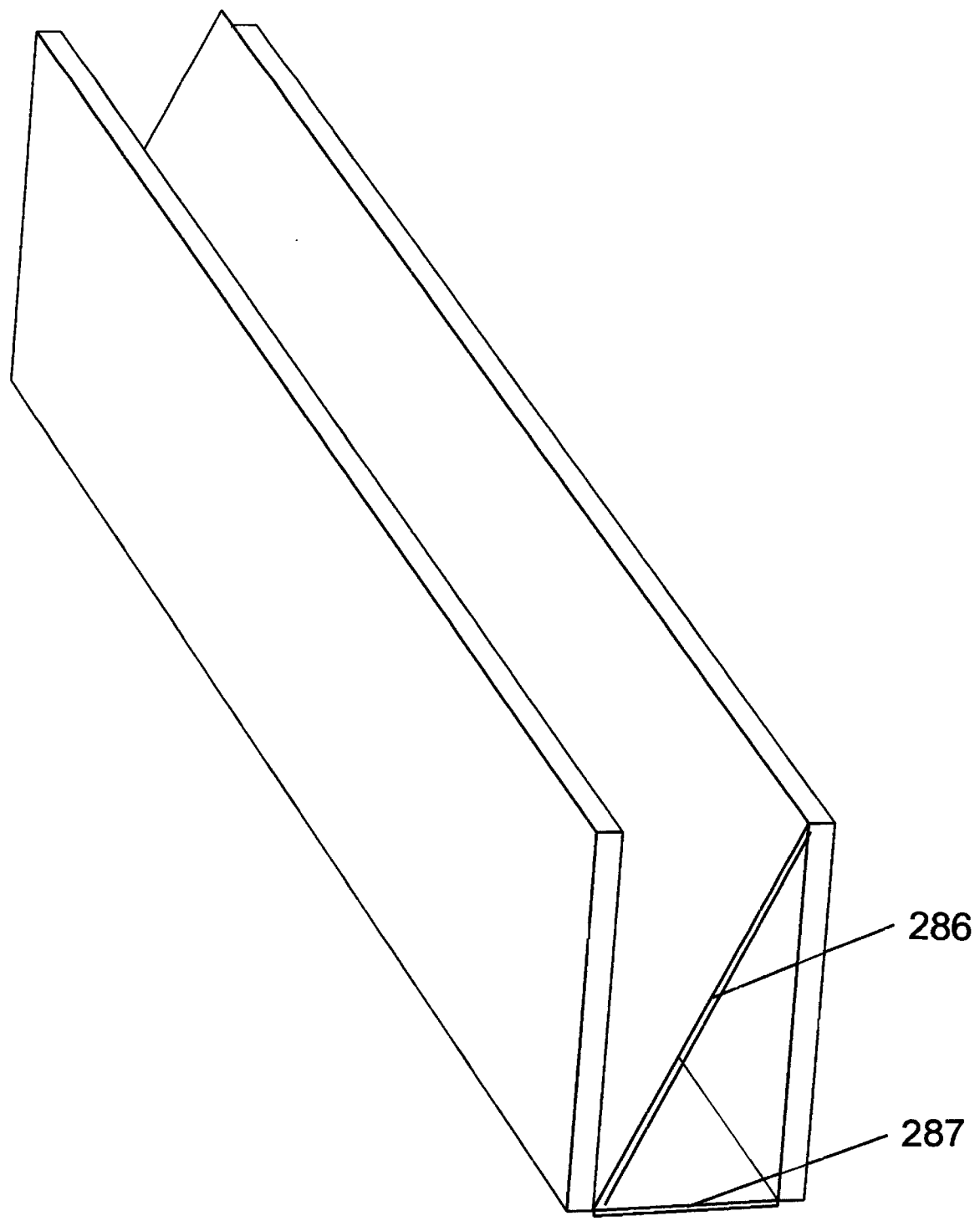
FIG. 26 is an enlarged view of one cell of the FIG. 24 assembly.

FIG. 26 is an enlarged view of one cell of the FIG. 24 assembly. A single prismatic surface 286 defines a void on either side of it. A single normal surface 287 forms a right angle with the rigid surfaces on either end of it. Each void is filled with fluid with a refractive index.

Figure 26A:
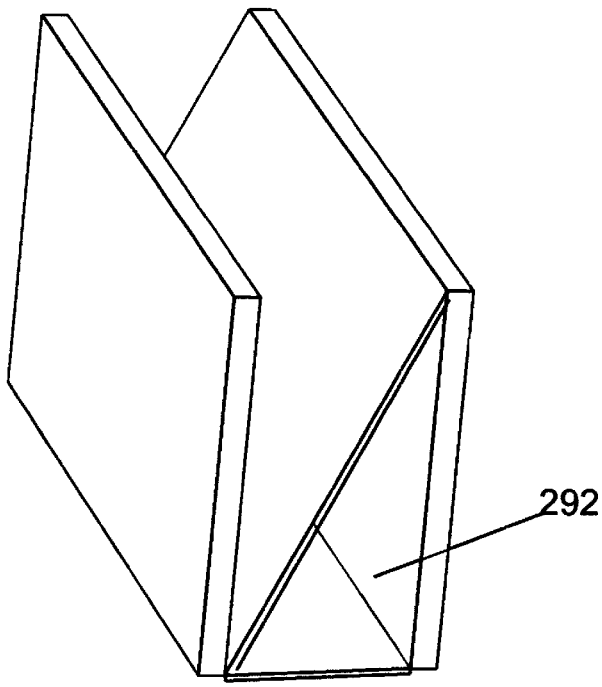
FIG. 26a is the same as FIG. 26 except utilizing a reflective fluid 292 under a membrane.

FIG. 26a is an enlarged view of one cell of the FIG. 24 assembly used in the reflective mode. The sealed void formed by the optical membrane is filled with a reflective fluid 292 such as mercury. This configuration enables the angle and curvature of the Fresnel membrane to be varied in curvature and angular pitch and the reflective fluid to reflect light.

Figure 26B:
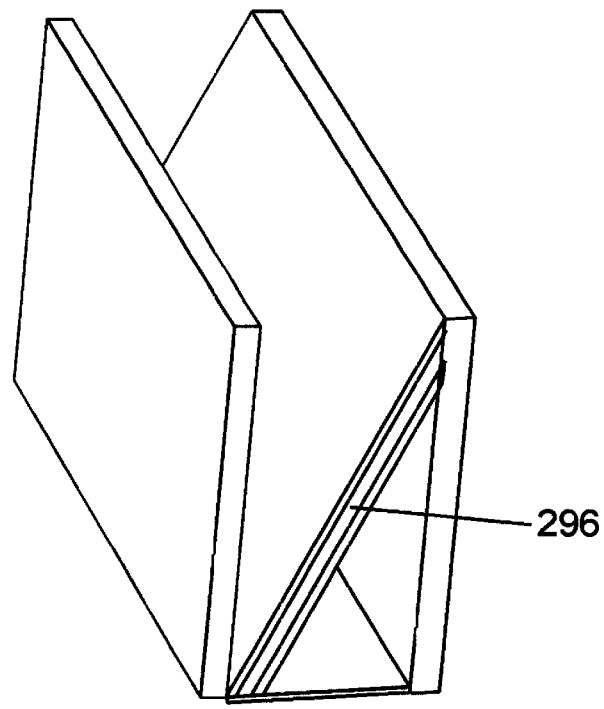
FIG. 26b is the same as FIG. 26a except utilizing a reflective fluid 296 between membranes.

FIG. 26b is an enlarged view of one cell of the FIG. 24 assembly used in the reflective mode. The Optical membrane sealably forms a narrower void 296. The narrower void is filled with a reflective fluid 296 such as mercury. This configuration utilizes less reflective fluid while enabling the angle and curvature of the Fresnel membrane to be varied in curvature and angular pitch and the reflective fluid to reflect light.

Figure 27:
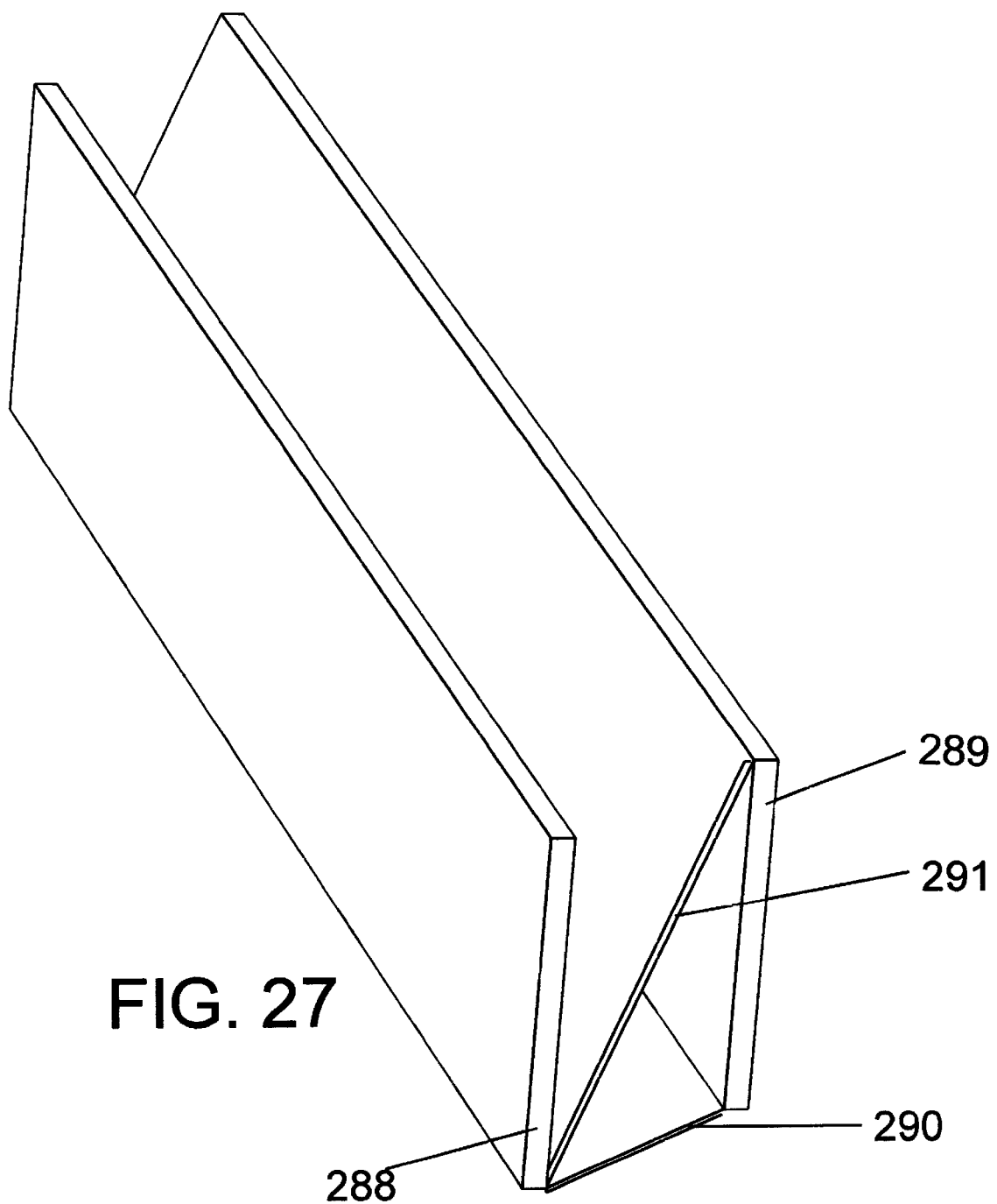
FIG. 27 is an enlarged view of one cell of the FIG. 24 assembly in a new configuration.

FIG. 27 is an enlarged view of one cell of the FIG. 24 assembly in a new configuration. A first offset rigid plane 288 has been slid relative to a second offset rigid plane 289. This causes the angle formed by offset normal surface 290 relative to the rigid planes to be other than right angles.

Figure 28:
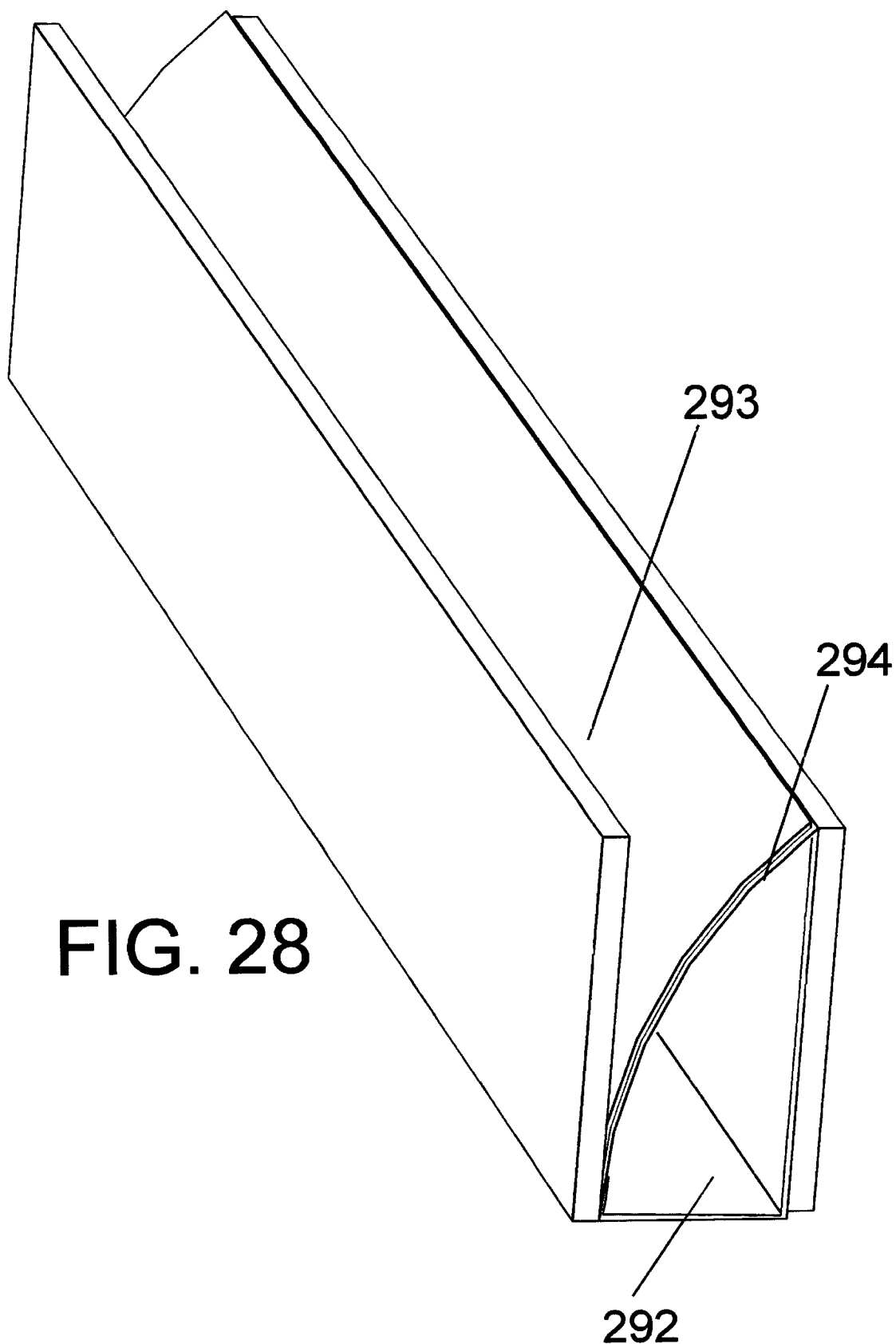
FIG. 28 is an enlarged view of one cell of the FIG. 24 assembly in another configuration.

FIG. 28 is an enlarged view of one cell of the FIG. 24 assembly in another configuration. A higher pressure void 292 and a lower pressure void 293 cause a curved prismatic surface 294 configuration.

FIG. 29 illustrates a parallel rigid transmissive grid. A first flange 295 is attached to a series of parallel rigid members such as first rigid cross support 297. Each parallel rigid member is attached to the valley of a parallel surface Fresnel optical membrane 299. Likewise on the opposing side of the membrane a 301 second flange supports a series of parallel rigid structures similar to a second rigid cross support 303. The point of disclosing this structure is that a rigid member consisting of parallel structures can be used as an alternate to the flat transparent structure utilized in previous diagrams. Such a rigid transmissive structure with parallel supports can also be used on only one side of the Fresnel optical membrane with the flat rigid transparent member being used on the other side of the optical membrane. This is desirable because it enables better control of cell curvature.

FIG. 30 illustrates a second embodiment of the variable view window. FIG. 30 shows a one pane assembly of a fluid actuated system. Seal pane 305 forms one side of the transparent assembly. Pane 305 is sealably attached to vertical channeled pane 307. Vertical channeled pane 307 has parallel channels in one side of it. Vertical channel 313 is one such channel that is open. Another such channel is plugged by channel plug 311. Horizontal channeled pane 309 has parallel channels in it. A horizontal channel 319 is one such channel which is open. The other horizontal channels are alternately plugged and open on alternate ends. All of the channels traverse the entire width or length of its respective pane except that each is plugged on one end or on the other end. Vertical actuation port 315 is an opening through both the horizontal and vertical panes connecting with a vertical channel but not through sealing pane 305. Horizontal actuation port 317 is an opening through only the horizontal pane connected to a horizontal channel. The horizontal and vertical panes have ports similar to those described that are located in positions such that they are accessible to one vertical channel or to one horizontal channel. Through the channels and ports, the assembled pane conducts actuation fluid to and from actuators which are illustrated in FIG. 32.

FIG. 31 illustrates the flexible membrane of FIG. 32. A stretchable seal with box 321 attaches on all four sides to the box of FIG. 32. A stretchable optical membrane 323 is the surface that describes the refractive or reflective surface. In the transmissive embodiment, the stretchable optical membrane is transparent. In the mirror embodiment, the stretchable optical membrane is reflective. Alternately, in the mirror embodiment, the optical membrane can be transparent but contain a reflective fluid such as mercury.

FIG. 32 illustrates a fully assembled liquid actuated variable view window using the embodiment disclosed in FIG. 30. Each side of the assembly has a means similar to fluid conduit 329 to pump actuation fluid to or from the ports and channels described in FIG. 30. Each fluid conduit controls access to a specific set of channels and ports such that the system operates in unison. Case 333 sealably attaches exterior pane 335 to the pane described in FIG. 30. Refractive fluid 337 is sealably contained between exterior pane 335 and a set of flexible plates. Flexible plate 341 being one such plate. The flexible plates are flexibly connected to one another and to the sides of the assembly with flexible seals. The flexible seals may have elastic qualities enabling stretching with memory or they may have a folded bend which unfolds to enable extension. Flexible seals may or may not be transparent. Flexible seal 339 being one such seal between two flexible plates. Actuator 331 is presented in cutaway view. Actuator 331 is sealably connected to a pane on one end and one of the flexible plates on the other end. Actuator 331 receives positive or negative fluid pressure which is communicated through one of the actuation ports. Each actuation port as referenced in FIG. 30 similarly transmits positive and negative pressure to one actuator similar to actuator 331. In operation, each fluid conduit controls a corresponding actuator on each flexible plate such that pressure added to one respective conduit will cause a series of corresponding actuators to expand and the respective corner on each flexible plate to raise. This motion on each flexible plate causes refractive fluid 337 to form a series of identical prism angles due to the angles of the flexible plates. The advantage of this embodiment is that hundreds of such flexible plates can be used to make a unit that is very wide and long, yet which is thin. Moreover each individual flexible plate need only to move a small distance to form the desired prism angle. Also the flexible membrane's dynamic range is minimized as are the quantities of fluid required.

Operation of the Invention

FIG. 7 depicts an optical membrane. The membrane is comprised of a 6 mil thick transparent material with high elasticity and memory. When actuated as later described, its walls can stretch or shrink to form desired prism angles and lens curvatures in the form of Fresnel surfaces. Polyurethane is a preferred material for this membrane. It can be either extruded and then molded to shape or it can be molded directly into shape. The membrane shape includes a series of peaks similar to a membrane peak 31. A variable Fresnel surface 33 connects the membrane peak to a membrane valley 35. A vertical wall 36 then runs from the membrane valley to the next membrane peak. This pattern is repeated a number of times to form the entire optical membrane. The reverse (non-visible) side of the optical membrane has the exact same features except in inverse. As later discussed desirable optical properties are achieved when a first fluid with a refractive index is on one side of the membrane and a second fluid having a second refractive index is on the second side of the membrane. When the shape of the membrane is changed, the refracting surfaces of the fluids too is changed.

FIG. 8 depicts three membranes welded together. A first welded membrane 37 is a flat extruded sheet of polyurethane 6 mils thick. It is transparent and flexible. The valleys of a welded optical membrane 39 are heat sealed to the first welded membrane. A second welded membrane 41 is a flat extruded sheet of polyurethane 6 mils thick. The peaks of the welded optical membrane 39 are heat sealed to the second welded membrane 41. The process of heat sealing these three components commences at the center and progresses outward. A valley is sealed to the first welded membrane then a peak is sealed to the second welded membrane then a valley is sealed to the first welded membrane. Note that progressing in this alternating manner, all valleys are welded to the first welded membrane and all peaks are welded to the second welded membrane. A circular weld at membrane peak 43 is shown. It and the other shown concentric circles are the heat sealed welds of all of the peaks of the welded optical membrane and the second welded membrane. Each of the aforementioned circular heat sealed welds forms a sealed compartment describing a circle. Each of these circular compartments on one side of the welded optical membrane will be filled with a first fluid and each of the circular compartments on the other side of the optical membrane will be filled with a second fluid.

FIG. 9 illustrates a cross section of three membranes welded. This is a slice taken from the center of the three welded membranes of FIG. 8. A vertical wall 45 is formed by the optical welded membrane. It is welded on each end. It forms one wall of the three sided circular chamber 47. A first member wall 49 forms a second side of the circular chamber. A first Fresnel optical membrane wall 51 forms the third side of the circular chamber 47. A series of similarly constructed and shaped circular chambers are formed on this same side of the optical membrane by the process discussed under FIG. 7. A opposite circular chamber 53 is similarly formed. It is sealably created between the first Fresnel optical membrane wall 51, a second membrane wall 55 and a second vertical wall 57. A series of chambers are similarly formed on this same side of the optical membrane. As the first membrane wall 49 is actuated apart from the second membrane wall 55, the vertical wall 45 and the second vertical wall 57 are stretched. This actuation can be achieved by either pumping more fluid into the circular chambers or by actuating rigid members apart (both are later discussed). Note that the angle at which the fluids reside relative to one another will also change due to the stretching of the first Fresnel optical membrane wall 51.

FIG. 10 depicts the welded membranes of FIG. 8 with chamber ports cut through a membrane. A port into circular chamber 71 represents the only means of communicating with the circular chamber housed between a first weld 67 and a second weld 69. As illustrated, each of the other chambers similarly has one respective port through which communication to the interior is possible. Fluid is added or removed from the circular chambers through the ports that are similar to the port into circular chamber 71. A first fluid completely fills all of the compartments on one side of the optical membrane while a second fluid completely fills all of the compartments on the other side of the optical membrane.

FIG. 11 shows an assembled, two valve unit. A first rigid member 73 has been glued to one side of the welded membrane assembly. The first rigid member is a piece of transparent glass and it is glued with a transparent glue to the welded membrane assembly. Similarly, a second rigid member 75 is glued to the other side of the welded membrane assembly. It too is a transparent piece of glass. The optical membrane installed 77 can be seen between the two rigid members. A membrane piercing channel 79 is protruding from the optical membrane. This is a flexible polyurethane tube which has sealably been welded in place such that it communicates with all of the circular chambers on one side of the optical membrane. It provides an alternate methodology to communicate with the chamber interiors. In this application it is used to communicate with one side of the optical membrane. An alternate means of communicating with the chamber interior is illustrated by a rigid member piercing fluid channel 81. The method of creating this means of communication is further discussed later. Each of the fluid channels include a protruding male end to enable a female supply hose (not shown) connection to occur. Actuating the rigid members away from one another (as later discussed) causes more fluid to enter each of the circular chambers and causes the prismatic surfaces to form steeper prism angles. Actuating the rigid members together causes fluid to exit the circular chambers and causes the prismatic surfaces to form shallower angles. Actuating the rigid members completely together will cause all of the fluid to exit the circular chambers and the prismatic surfaces to be parallel with the rigid members. In this configuration, a ray normal to the rigid members will pass straight through the optical membrane structure with being redirected.

FIG. 12 illustrates light refraction through a multiple surfaced cross-section. (Light diffraction could be similarly described according to FIG. 33. An incident light ray 83 passes through a first fluid 84 with a first refractive index. In this illustration, the first refractive fluid has a refractive index near 1.00. The light ray then passes through an optical Fresnel membrane cross section 85. The optical member cross section creates the separation of the first fluid from a second fluid 86. The optical member cross section also defines the angle at which light traveling though the unit will leave the first fluid and enter the second fluid. In this illustration, the second fluid has an index of refraction great than that of the first fluid. The light ray is therefore refracted in accordance with Snell's law. A resultant light ray 89 is accordingly bent to a new trajectory. Note that other rays entering the system on similar trajectories are also similarly refracted. A variable angle 87 is described between the optical membrane and the elastic wall 91. The variable angle can be used as an indicator of the pitch of the prismatic surface. The greater this angle, the shallower the prismatic surface (when the system is fully compressed, this angle will reach nearly ninety degrees and the elastic wall 91 will have a length of near zero. As the variable angle is decreased the optical Fresnel membrane cross section 85 will stretch to from a prismatic surface with greater refraction.

FIG. 13 illustrates a multi-valve unit semi-assembled. All of the components are identical to those previously discussed with one exception. The previous unit had one supply channel for each of the two refractive fluids, such that one channel connected all of the chambers on one side and a second channel connected all of the chambers on the second side. This two channel system enabled delivery of one fluid to one side at a first pressure and the second fluid to the second side at a second pressure. The provided the means to create a pressure differential between the two sets of concentric circular chambers. In contrast, the unit of FIG. 13 includes individual channels to communicate with each respective sealed chamber and thus the means to vary the pressure differential in each respective chamber. A welded membrane assembly 95 has been glued between a first channeled member 99 and a second channeled member 101. These channeled members are transparent glass with channels cut into one surface. Additionally, at the interior end of each channel a hole has been drilled through the first channeled member and the membrane glued thereto such that each hole communicates with one circular chamber as previously defined. A first channel 103 has been called out as one such channel of the first member and a second channel 107 has been called out as one of the series on the second member. Using a distributor as later discussed, the pressure of fluid in each compartment can be controlled such that optical membrane curvature can be varied for each section of the optical membrane. Thus a variable Fresnel lens is generated.

FIG. 14 illustrates holes through the membrane for multi-valve unit. This is the same structure as FIG. 13 with the first member removed to reveal the membrane pierced for multi-valves 111. The holes go through the one membrane such that each communicates with the interior of one circular channel. A membrane port 113 is one such hole. On the other side of the membrane assembly, a laminated channeled member 114 has been glued to an additional rigid member 116. This additional rigid member is a transparent glass. It has been added to sealably form a wall for all of the channels that were previously described. A connection tube 118 provides a means to hook a female tube up to the assembly, through which communicating fluid to the respective circular channel is possible. The other channels have been similarly fitted with a male member. The first fluid is selective pumped into all of the holes on one side of the unit in coordination with the pumping of the second fluid selectively into all of the holes on the other side of the unit.

FIG. 15 depicts a multi-valve unit fully assembled. A first fluid connection tube 119 has been sealably inserted into one of the previously described channels. It enables communication with one circular chamber. Each of the other tubes likewise communicates with one circular chamber. A second fluid connection tube 121 has been called out as a representative of the tubes on the other side of the membrane structure. The first fluid is selective pumped into all of the tubes on one side of the unit in coordination with the pumping of the second fluid selectively into all of the tubes on the other side of the unit.

FIG. 16 illustrates ray tracing through the optical components of a multi-valve unit. A second incident ray 123 passes through a chamber with first fluid 125. This chamber contains a fluid with a first refractive index. In this illustration, the refractive index would be slightly greater than 1.00. The light ray is then incident upon a first Fresnel optical membrane curved surface 127 whereupon it is bent according to Snell's law. It then enters the chamber with second fluid 129. Fluid in this chamber is assumed to have a refractive index higher than that in the first chamber. The ray is refracted according to Snell's law into a new trajectory as a refracted ray 133. The curvature of the first optical membrane curved surface is caused by introducing a negative fluid pressure into the chamber with first fluid and a concomitant positive pressure in the chamber with second fluid. This pressure mismatch causes the first optical membrane curved surface to bend away from the chamber of high pressure into the chamber of low pressure. The curvature of each individual chamber wall is possible due to the fact that each circular chamber is individually supplied with fluid by its own port and channel as previously described. Accordingly a second optical membrane curved surface has a different curvature than does the first optical membrane curved surface. This is because the pressure differential on each side of the wall of the second optical membrane curved surface are different than the pressure on opposite sides of the first optical membrane curved surface. A third incident ray 137 is called out to illustrate that it will be refracted at the negative of the first example. This is because they are each responding to the mirror of the other's curvature. They are on the opposite sides of the optic center but they are actually the same circular chamber (180 degrees apart). A focal length 139 has been created by adjusting the pressures of each circular chamber such that a convergent lens is created. The focal length can be adjusted by a process of calculating the curve required in each chamber to achieve a desired focal length and then creating each of these curves through pressure differentials and actuating the rigid members closer together or further apart to control the optical membrane angle slope (the FIG. 12 variable angle 87) as needed. Actuating the two rigid members to which these membranes are connected (not shown) will cause the angles of the curved surfaces to be steeper.

FIG. 17 illustrates additional system actuation means. This actuation means has been mentioned previously. A first actuated rigid member 147 represents the transparent glass that has been previously described. Similarly a second actuated rigid member is the same transparent glass previously described. A first set of cylinder hardware 141 and a second set of cylinder hardware 145 each connect one end of a cylinder 143 to one of the corners of the two rigid members. A actuated optical void 151 resides between the two rigid members. Note that this optical void can be increased and decreased by using the cylinder (or the others similar) to push the two rigid members apart. Likewise the void can be decreased by using the cylinder to pull the rigid members together. The cylinder is a pneumatic as other the others depicted. As the rigid members are actuated apart, the variable angle of FIG. 87 is decreased and the prismatic surface becomes steeper. Using actuation in conjunction with increasing or decreasing fluid content in the fluid chambers enables one to control prism and lens angles.

FIG. 18 additional hardware required. A first injection tube 153 is a male tube similar to those projecting from the multi-channel unit previously described. A hose (not shown) connects this injection tube to one of the tubes on the (FIG. 15) multi-channel unit. Each of the other tubes depicted here are similarly connected by hoses (not shown) to one of the tubes on one side of the (FIG. 15) multi-channel unit previously discussed. The first injection tube is connect to a first distributor 155. This distributor handles one of the two fluids previously discussed. It controls how much pressure is provided to each of the respective circular chambers and thus helps determine the curvature of each of the individual circular chambers. The first distributor has a first distributor tube 157 which receives positive or negative pressure from a first pump 161 via a first pump tube 159. Excess fluid of one type is kept in a first reservoir 163. Combined, these apparatus help determine the slope of the prism surfaces on the optical surfaces and the curvature of the lens surfaces on the optical surfaces. Similarly, controlling the second fluid's volume and pressure within the welded assembly are a second distributor 165, a second pump 167, and a second reservoir 169. Within the distributor is a valve that opens or closes fluid flow to each of the injection tubes. Using this system, the valve to one injection tube at a time can be opened for creating different curvatures on each optical surface or the valves to all of the tubes can be opened to create identical curves on each of the optical surfaces (or flat prismatic surfaces). Also within the each of the distributors is a flow monitor that monitors the flow from the distributor tubes. This enables monitoring of the fluid quantity flowing through each respective injection tube. The distributor valves are turned off and on by computer. The flow monitor is monitored by a computer. Computer monitoring, processing, memory, and control will be further discussed later.

It should be noted that on the two valve unit, a direct connection from the first pump to one side of the optical membrane and a second connection from the second pump to the other side of the optical membrane is possible (assuming a pressure regulator is built into the pump assembly). No distributor is needed to control pressure individually in each of the curved chambers.

FIG. 19 depicts non-parallel surfaces. Heretofore all of the examples herein described rigid members that were largely actuated such that they remained parallel. Using the cylinders of FIG. 17, the rigid members can be actuated into non-parallel planes. A 171 first non-parallel member is actuated away from a second non-parallel member. This configuration creates desirable ray directing effects within the welded membranes (not shown) normally residing within the angular void 173.

FIG. 20 depicts a Fresnel variable mirror. An incoming ray 177 passes through a rigid transmissive member 179. The rigid transparent member forms one side of a positive pressure gas in concentric chamber 181. This positive pressure is on one side of a reflective Fresnel membrane 185. This together with the negative pressure gas in concentric chamber 183 on the opposite side of the reflective membrane causes the membrane to bend into a Fresnel surface focusing mirror. A resultant reflected ray 187 joins the other rays at a focus point. The focal length is variable by varying the distance of the two rigid members from one another and varying the pressure of either side of the membrane. Each concentric chamber's pressure can be independently controlled.

Computer control of the optical surfaces is not needed when using a two tube model where the optical membrane curvature is not to vary from chamber to chamber. A flat prismatic surface can be created by introducing the same pressures of fluid into each side of the membrane. Curved surfaces can be created in the two tube model by simply applying more pressure on one side than the other (and holding the actuating cylinders in a stable position). This does not require a computer either. Control for the two tube model can thus be achieved by a user controlling precision reversible pumps to supply the two fluids and to power the actuation cylinders.

Computer control is required for making more complex surfaces where each concentric surface of the optical membrane is curved differently (as with the multi-channel unit). Calculation must be made as to what curvature is required on each optical surface to create a correct Fresnel lens with desired characteristics. Once this is calculated, the quantity of liquid required in each chamber must be calculated. Then, this quantity of fluid must be added (or subtracted) to the fluid already in each chamber (a quantity that must be stored in memory). This addition or subtraction of fluid must be precisely monitored and controlled by computer. The computer must also calculate the positions that each of the actuation cylinders should be in and move them to the required position. This paragraph represents a brief flowchart of the computer process required.

FIG. 22 represents the sheets that when actuated form variable prismatic surfaces, shown currently in the non-actuated state. Voids on either side of elastic sheet 263 may be totally empty or may contain some small amount of fluid. Even in the later case, because the fluid takes the shape of its container, and the two surfaces of any represented void are nearly perfectly parallel, no net refraction is occurring when in the shown configuration.

FIG. 23 represents an actuated version of the structure of FIG. 22. Surfaces 272 and 273 have been moved apart. In so doing, prismatic surfaces similar to prismatic surface 284 in elastic sheet have been formed. The prismatic angle of this surface is continuously adjustable over a wide range. As sheets 272 and 273 are moved farther apart, the prismatic angle increases, the closer sheet 272 is to sheet 273, the lesser the prismatic angle. Into the voids on one side of elastic sheet 263 is drawn a fluid with a first refractive index. Into the void on the opposite side of elastic sheet 263, is drawn a fluid with a second refractive index. As light passes through the assembly, it experiences a net refraction. The refraction can be adjusted at will by a user. The user can thereby adjust the view provided through the window from any given vantage point. When fluid of a higher refractive index is drawn into the positive void and fluid of a lower refractive index is drawn into the negative void, the net refraction is positive. When fluid of a higher refractive index is drawn into the negative voids and fluid of a lower refractive index is drawn into the positive voids, the net refraction is negative. This difference determines in which direction the user will see, negative being in one direction and positive being in the opposite direction. Note that the fluids can be pumped from either end of the unit. Since the positive voids are sealed on one end and the negative voids are sealed on the opposite end, the fluids filling either side can be varied simply by pumping one on one side and/or the other on the other side. The mechanism to pump fluid on either side are well known to the art and are not shown.

FIG. 24 contains the structure of FIG. 23 as well as rigid planes 283 and 284. In operation, planes 283 and 284 can be actuated by pump or otherwise. Actuating these planes, to which planes 272 and 273 are sealably fastened, creates vacuums within the voids into which fluids with the desirable respective refractive indices are drawn or pumped. Rigid planes 283 and 284 can also slide relative to one another. Sliding will cause sheet 277 of FIG. 23 to form a desirable angle. It may be useful for the angle to be perpendicular to the rigid planes or to form another angle parallel to a user's desired viewing angle. This sliding can be manipulated by the user to ensure maximum light passage and its usefulness will vary depending upon the users viewing perspective and the desired viewing angle. Planes 283 and 284 also perform a protective strengthening function to ensure that the integrity of the unit is maintained.

FIG. 25 shows the actuated elastic sheet 285 forming prismatic surfaces. The two sets of angles on this sheet are independently variable by sliding (to determine the normal angles) and by moving apart of the rigid planes (to determine the prismatic angles.) Note that the unit can also be used to close the view through the window. This can be achieved by increasing the prismatic angle until it reaches the point of total internal reflection. In this configuration, the user can not see out of the window, neither can anyone see in through the window. This is a methodology to transition a window or lens from a transparent state to an opaque state. In practice two such structures are used together with three refractive fluids (including one with low refractive index such as a gas) to achieve refraction and minimize dispersion according to this invention. (The ray tracing in FIG. 17 helps to illustrate polychromatic light entering a first prism, being dispersed and exiting a second prism with two colors traveling on parallel trajectories to minimize chromatic distortion.)

FIG. 26 illustrates a close up view of single prismatic surface 286. The angle of this surface relative to the rigid planes on either side of it determines the net refraction of the unit. This angle can be increased to the point of total internal reflection at which time, light will not coherently pass through the window. The amount of refraction that occurs at any given angle is determined by the fluid selected to fill the voids of any given unit. The angle of total internal reflection also is a function of the refractive index of the fluid that fills the voids. In this illustration, the rigid planes have been slid such that the single normal surface 287 is perpendicular to both rigid planes.

FIG. 27 illustrates the effect upon any single prismatic and normal surfaces when plates 288 and 289 are slid relative to one another. More specifically the angle formed by 290 is an angle other than perpendicular to the rigid planes. Modifying this angle by sliding the rigid planes enables the user to maximize the light throughput from a users desired viewing direction to a user's desired viewing position. The maximum light throughput is achieved when 290 is caused to form an angle whereby it is parallel to the light that the user wants to view as that light passes through the unit.

FIG. 28 illustrates the ability of the user or the computer to curve the prismatic surface. This is achieved by creating a pressure within higher pressure void 292 in excess of the pressure in lower pressure void 293. The fluid conforming to the curve can function as a magnification lens when the refractive index of the fluid in void 293 is higher than the refractive index of the fluid in void 292. The fluid conforming to the curve can serve as a plano-convex reducing lens when the refractive index of the fluid in void 292 is higher than the refractive index of the fluid in void 293. These effects are useful especially when the user selects higher viewing angles with corresponding larger prismatic angles because this causes the image to appear elongationally reduced in one direction and to be elongationally magnified in the opposites direction. The curves enable the user to minimize this distortion.

FIG. 30 illustrates a second embodiment of the variable view window. FIG. 30 shows a one pane assembly of a fluid actuated system. Seal pane 305 forms one side of the transparent assembly. Pane 305 is sealably attached to vertical channeled pane 307. Vertical channeled pane 307 has parallel channels in one side of it. Vertical channel 313 is one such channel that is open. Another such channel is plugged by channel plug 311. Horizontal channeled pane 309 has parallel channels in it. A horizontal channel 319 is one such channel which is open. The other horizontal channels are alternately plugged and open on alternate ends. All of the channels traverse the entire width or length of its respective pane except that each is plugged on one end or on the other end. Vertical actuation port 315 is an opening through both the horizontal and vertical panes connecting with a vertical channel but not through sealing pane 305. Horizontal actuation port 317 is an opening through only the horizontal pane connected to a horizontal channel. The horizontal and vertical panes have ports similar to those described that are located in positions such that they are accessible to one vertical channel or to one horizontal channel. Through the channels and ports, the assembled pane conducts actuation fluid to and from actuators which are illustrated in FIG. 32.

FIG. 32 illustrates a fully assembled liquid actuated variable view window using the embodiment disclosed in FIG. 30. Each side of the assembly has a means similar to fluid conduit 329 to pump actuation fluid to or from the ports and channels described in FIG. 30. Each fluid conduit controls access to a specific set of channels and ports such that the system operates in unison. Case 333 sealably attaches exterior pane 335 to the pane described in FIG. 30. Refractive fluid 337 is sealably contained between exterior pane 335 and a set of flexible plates. Flexible plate 341 being one such plate. The flexible plates are flexibly connected to one another and to the sides of the assembly with flexible seals. The flexible seals may have elastic qualities enabling stretching with memory or they may have a folded bend which unfolds to enable extension. Flexible seals may or may not be transparent. Flexible seal 339 being one such seal between two flexible plates. Actuator 331 is presented in cutaway view. Actuator 331 is sealably connected to a pane on one end and one of the flexible plates on the other end. Actuator 331 receives positive or negative fluid pressure which is communicated through one of the actuation ports. Each actuation port as referenced in FIG. 30 similarly transmits positive and negative pressure to one actuator similar to actuator 331. In operation, each fluid conduit controls a corresponding actuator on each flexible plate such that pressure added to one respective conduit will cause a series of corresponding actuators to expand and the respective corner on each flexible plate to raise. This motion on each flexible plate causes refractive fluid 337 to form a series of identical prism angles due to the angles of the flexible plates. The advantage of this embodiment is that hundreds of such flexible plates can be used to make a unit that is very wide and long, yet which is thin. Moreover each individual flexible plate need only to move a small distance to form the desired prism angle. Also the flexible membrane's dynamic range is minimized as are the quantities of fluid required.

Additional Embodiments

The transmissive structures herein can also be used to change a window between a transparent and opaque state by increasing a prism angle in excess of the total internal reflection angle.

The preceding is not to be construed as any limitation on the claims and uses for the structures disclosed herein.

Previous Disclosures

Previous disclosures in the form of patent applications and provisional applications have been filed by the present inventor. They include the techniques for reducing the dispersion associated with refraction using a fluid with a refractive index to counteract the chromatic distortion effects of dispersion. Previous filings include the use of computer software and hardware to actuate surfaces, monitor temperature, control temperature, and reduce dispersion. Such techniques as previously disclosed by the present applicant can also be used with the present structures disclosed herein but have not be rediscussed to avoid redundancy.

Advantages

The advantages of utilizing variable Fresnel type structures as described herein are manifold. One structure can function as a variable focusing prism. The same structure can function as a variable lens with varying focal length. Thus, one optical structure can be manipulated to change its optical properties quickly and reliably and as frequently as required. In the mirror application, light weight, thin, variable reflective optics can reliable produce a range of focal lengths. Clearly the objects of illumination, entertainment, communications, science, photography, telescopy, medicine, and magnification (among many others) will all benefit from this new technology Conclusion, Ramifications, and Scope Thus the reader will see that the variable Fresnel type structures and process of this invention provides a highly functional and reliable means to alter how electromagnetic energy is directed by an optical structure. The applications of this new structure and process are too numerous to list herein.

While my above description describes many specifications, these should not be construed as limitations on the scope of the invention, but rather as an exemplification of one preferred embodiment thereof. Many other variations are possible. For example other means of actuation can be utilized. The rigid structures as described herein need not be flat. The flexible optical membrane can be sealably glued to rigid curved surfaces. The same Fresnel surfaces will be created and can be manipulated in identical ways to create other desirable effects. In the lens application, any two fluids can be used with this apparatus but one gas with a low index of refraction and one liquid with a high index of refraction is desirable. The term fluid as used herein is defined by any material can conform to the shape of its container. Other transparent membranes with high elasticity and memory such as latex can be used in place of polyurethane. The optimal shape for Fresnel surfaces is generally round formed in concentric circles, however concentric shapes that are generally less efficient are also anticipated and incorporated herein (such as squares, hexagons, and ovals for example). Also, though the optimal design incorporates concentric surfaces that encompass 360 degrees at some constant distance from the center of the structure. Concentric surfaces of less than 360 degrees are anticipated herein. The prior art hasn't anticipated any variable Fresnel lens or mirrors.

Accordingly, the scope of the invention should be determined not by the embodiment(s) illustrated, but by the appended claims and their legal equivalents.

I claim:

1. A variable means to alter the path of a ray of electromagnetic radiation comprising:
   a) a membrane having elasticity connected on a first side to a first rigid member along a first line and along a second line;
   b) said first line and second line being parallel to one another;
   c) said membrane having elasticity connected on a second side to a second rigid member along a third line;
   d) said third line being parallel to said first line;
   e) a means to move said first rigid member relative to said second rigid member whereby said movement alters said membrane's shape
   f) said electromagnetic radiation being incident upon said membrane.

2. The means as described in claim 1, wherein a fluid which is transparent to at least some wave lengths of electromagnetic radiation is in communication with said membrane.

3. The means as described in claim 1, wherein a fluid which is reflective of at least some wave lengths of electromagnetic radiation is in communication with said membrane.

4. The means as described in claim 1, wherein said membrane is transparent to at least one wavelength of electromagnetic radiation.

5. The means as described in claim 1, wherein said membrane is reflective of at least one wavelength of electromagnetic radiation.

6. The means as described in claim 1, configured as a Fresnel prism.

7. The means as described in claim 1 configured as a Fresnel mirror.

8. The means as described in claim 1, wherein a pressure differential on said first side of said membrane relative to said second side of said membrane causes said membrane to form a curve.

9. A variable means to alter the path of a ray of electromagnetic radiation comprising:
   f) a membrane having elasticity connected on a first side to a first rigid member along a first circle and along a second circle;
   g) said first circle and second circle being concentric and coplanar with one another;
   h) said membrane having elasticity connected on a second side to a second rigid member along a third circle;
   i) said third circle being in a plane parallel to said first circle;
   j) a means to move said first rigid member relative to said second rigid member whereby said movement alters said membrane's shape
   f) said electromagnetic radiation being incident upon said membrane.

10. The means as described in claim 9, wherein a fluid which is transparent to at least some wave lengths of electromagnetic radiation is in communication with said membrane.

11. The means as described in claim 9, wherein a fluid which is reflective of at least some wave lengths of electromagnetic radiation is in communication with said membrane.

12. The means as described in claim 9, wherein said membrane is transparent to at least one wavelength of electromagnetic radiation.

13. The means as described in claim 9, wherein said membrane is reflective of at least one wavelength of electromagnetic radiation.

14. The means as described in claim 9, configured as a Fresnel lens.

15. The means as described in claim 9 configured as a Fresnel mirror.

16. The means as described in claim 9, wherein a pressure differential on said first side of said membrane relative to said second side of said membrane causes said membrane to form a curve.

* * * * *